(12) United States Patent
Mihindukulasooriya et al.

(10) Patent No.: US 11,080,491 B2
(45) Date of Patent: Aug. 3, 2021

(54) FILTERING SPURIOUS KNOWLEDGE GRAPH RELATIONSHIPS BETWEEN LABELED ENTITIES

(71) Applicant: International Business Machines Corporation, Armonk, NY (US)

(72) Inventors: Nandana Mihindukulasooriya, Cambridge, MA (US); Robert G. Farrell, Cornwall, NY (US); Nicolas Rodolfo Fauceglia, New York, NY (US); Alfio Massimiliano Gliozzo, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/600,774

(22) Filed: Oct. 14, 2019

(65) Prior Publication Data

US 2021/0109995 A1 Apr. 15, 2021

(51) Int. Cl.
*G06F 40/30* (2020.01)
*G06F 16/335* (2019.01)
(Continued)

(52) U.S. Cl.
CPC ............ *G06F 40/30* (2020.01); *G06F 16/335* (2019.01); *G06F 16/9024* (2019.01);
(Continued)

(58) Field of Classification Search
USPC ...................................................... 704/7–10
See application file for complete search history.

(56) References Cited

U.S. PATENT DOCUMENTS 10,824,675 B2 * 11/2020 Alonso ............... G06F 16/2425
2017/0177703 A1 6/2017 Liu
(Continued)

FOREIGN PATENT DOCUMENTS

CN 105824802 A 8/2016

OTHER PUBLICATIONS

Faralli, et al. "Efficient Pruning of Large Knowledge Graphs." Proceedings of the Twenty-Seventh International Joint Conference on Artificial Intelligence (IJCAI-18). 9 pages.
(Continued)

*Primary Examiner* — Leonard Saint Cyr
(74) *Attorney, Agent, or Firm* — Amin, Turocy & Watson, LLP

(57) ABSTRACT

Systems and techniques that facilitate spurious relationship filtration from external knowledge graphs based on distributional semantics of an input corpus are provided. In one or more embodiments, a context component can generate a context-based word embedding of one or more first terms in a document collection. The embedding can yield vector representations of the one or more first terms. The one or more first terms can correspond to knowledge terms in one or more first nodes of a knowledge graph. In one or more embodiments, a filtering component can filter out a relationship between the one or more first nodes and a second node of the knowledge graph based on a similarity value being less than a threshold. The similarity value can be a function of the vector representations of the one or more first terms. In various embodiments, cosine similarity can be used to compute the similarity value.

20 Claims, 15 Drawing Sheets

(51) Int. Cl.

| | | |
|---|---|---|
| *G06F 16/901* | (2019.01) | |
| *G06F 40/211* | (2020.01) | |
| *G06F 40/247* | (2020.01) | |
| *G06F 40/268* | (2020.01) | |
| *G06F 40/284* | (2020.01) | |
| *G06F 40/295* | (2020.01) | |

(52) U.S. Cl.
CPC .......... *G06F 40/211* (2020.01); *G06F 40/247* (2020.01); *G06F 40/268* (2020.01); *G06F 40/284* (2020.01); *G06F 40/295* (2020.01)

(56) References Cited

U.S. PATENT DOCUMENTS

| | | | |
|---|---|---|---|
| 2017/0193393 A1* | 7/2017 | Contractor | G06N 5/022 |
| 2018/0048662 A1 | 2/2018 | Jang et al. | |
| 2018/0053327 A1* | 2/2018 | Contractor | G06F 16/35 |
| 2019/0042988 A1* | 2/2019 | Brown | G06Q 10/0631 |
| 2019/0155926 A1 | 5/2019 | Scheideler et al. | |
| 2019/0155961 A1* | 5/2019 | Alonso | G06F 16/284 |
| 2019/0332946 A1* | 10/2019 | Han | G06N 20/00 |
| 2019/0354887 A1* | 11/2019 | Subramanian | G06F 16/9024 |
| 2020/0242484 A1* | 7/2020 | Lecue | G06F 17/11 |

OTHER PUBLICATIONS

"ISIM 6.0 Fix Pack 11 install fails to DeployITIMEba." IBM Support. https://www.ibm.com/support/pages/isim-60-fix-pack-11-install-fails-deployitimeba. Last Accessed Sep. 11, 2019. 2 pages.

"Probable DNA polymerase III, delta prime subunit FP0011 (Q23404525)." Wikidata. https://www.wikidata.org/wiki/Q23404525. Last Accessed Sep. 11, 2019.

Liu, et al. "Automatic taxonomy construction from keywords." KDD '12 Proceedings of the 18th ACM SIGKDD International conference on Knowledge discovery and data mining, pp. 1433-1441, Beijing, China—Aug. 12-16, 2012. 9 pages.

Wang, et al. "Knowledge Graph and Text Jointly Embedding." Proceedings of the 2014 Conference on Empirical Methods in Natural Language Processing (EMNLP), pp. 1591-1601, Oct. 25-29, 2014, Doha, Qatar. 11 pages.

Wang, et al. "Text-Enhanced Representation Learning for Knowledge Graph." Proceedings of the Twenty-Fifth International Joint Conference on Artificial Intelligence (IJCAI-16). New York, New York, USA—Jul. 9-15, 2016. 7 pages.

Kartsaklis, et al. "Mapping Text to Knowledge Graph Entities using Multi-Sense LSTMs." Proceedings of the 2018 Conference on Empirical Methods in Natural Language Processing, pp. 1959-1970, Brussels, Belgium, Oct. 31-Nov. 4, 2018. 12 pages.

Zhong, et al. "Aligning Knowledge and Text Embeddings by Entity Descriptions." Proceedings of the 2015 Conference on Empirical Methods in Natural Language Processing, pp. 267-272, Lisbon, Portugal, Sep. 17-21, 2015. 6 pages.

"ConceptNet: An open, multilingual knowledge graph." http://conceptnet.io/. Last Accessed Sep. 11, 2019. 4 pages.

"Dbpedia." https://wiki.dbpedia.org/. Last Accessed Sep. 11, 2019. 4 pages.

"Semantic Web." https://en.wikipedia.org/wiki/Semantic_Web. Last Accessed Sep. 11, 2019. 13 pages.

"Wikidata." https://www.wikidata.org/wik/Wikidata:Main_Page. Last Accessed Sep. 11, 2019. 4 pages.

"WordNet: A Lexical Database for English." https://wordnet.princeton.edu/. Last Accessed Sep. 11, 2019. 4 pages.

Roller, et al. "Hearst Patterns Revisited: Automatic Hypernym Detection from Large Text Corpora." Proceedings of the 56th Annual Meeting of the Association for Computational Linguistics (Short Papers), pp. 358-363. Melbourne, Australia, Jul. 15-20, 2018. 6 pages.

Hearst. "Automatic acquisition of hyponyms from large text corpora." Proceedings of the 14th conference on Computational linguistics, pp. 539-545. ACL 1992. 7 pages.

Roller, et al. "Inclusive yet Selective: Supervised Distributional Hypernymy Detection." Proceedings of COLING 2014, the 25th International Conference on Computational Linguistics: Technical Papers, pp. 1025-1036, Dublin, Ireland, Aug. 23-29, 2014. 12 pages.

Wang, et al. "A Short Survey on Taxonomy Learning from Text Corpora: Issues, Resources and Recent Advances." Proceedings of the 2017 Conference on Empirical Methods in Natural Language Processing, pp. 1190-1203. EMNLP 2017. 14 pages.

* cited by examiner

FILTERING SPURIOUS KNOWLEDGE GRAPH RELATIONSHIPS BETWEEN LABELED ENTITIES

BACKGROUND

The subject disclosure relates to knowledge graph relationship filtration, and more specifically to the filtration of spurious relationships based on distributional semantics of an input corpus. When constructing a domain database or domain taxonomy to query or search an input corpus, conventional systems merely extract terms from the input corpus, match the extracted terms to entities in an external knowledge graph, and retrieve relationships from the knowledge graph between the matched entities. Conventional systems then construct the domain database or taxonomy using the retrieved relationships, which causes the constructed database or taxonomy to indicate that the extracted terms have the retrieved relationship between them. Since they do not evaluate at all the relevance of any retrieved relationship, conventional systems treat the external knowledge graph as a ground truth (e.g., infallible), and any conventional activity focuses only on dealing with noisy data extracted from the input corpus. A major problem with this conventional approach is that spurious (e.g., true but irrelevant) relationships in the knowledge graph are nevertheless included in the constructed database or taxonomy. This causes the constructed database or taxonomy to indicate the existence of relationships between the extracted terms that, although true in one linguistic sense, are unrelated or inapplicable to the extracted terms as used in the input corpus. Thus, there exists a need in the prior art for a system and/or technique of filtering out relationships from a knowledge graph that do not apply to a corpus when terms in the corpus match labels, descriptions, or definitions of nodes/entities in the knowledge graph.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate spurious relationship filtration based on distributional semantics are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a context component, which can generate a context-based embedding (e.g., via Word2Vec, Continuous Bag of Words, Skip Gram, GloVe (Global Vectors), BERT (Bidirectional Encoder Representations from Transformers), and so on) of one or more first terms in a document collection (e.g., input corpus). The context-based embedding can yield vector representations of the one or more first terms. In one or more aspects, the one or more first terms can correspond (e.g., be matched or linked) to knowledge terms (e.g., labels, descriptions, definitions, and so on) in one or more first nodes of a knowledge graph (e.g., WordNet, DBpedia, ConceptNet, Wikidata, and so on). In various embodiments, the computer-executable components can comprise a filter component, which can filter out a relationship (e.g., hypernymy, hyponymy, synonymy, antonymy, partonomy, supplier, entailment, and so on) between the one or more first nodes and a second node of the knowledge graph based on a similarity value being less than a threshold. In one or more aspects, the similarity value can be a function of the vector representations of the one or more first terms (e.g., cosine similarity, Euclidean distance, dot product, cross product, and so on). In one or more embodiments, the similarity value can be based on a cosine similarity between the vector representations of the one or more first terms and a vector representation of a second term in the document collection corresponding to the second node. In one or more embodiments, the similarity value can be based on average pairwise cosine similarities between the vector representations of the one or more first terms. In one or more embodiments, the similarity value can be based on cosine similarities between the vector representations of the one or more first terms and a vector representation of a prototypical term in the one or more first terms.

According to one or more embodiments, the above-described system can be implemented as a computer-implemented method. The computer-implemented method can include generating, by a device operatively coupled to a processor, the context-based embedding that yields vector representations of the one or more first terms and filtering out, by the device, the relationship based on the vector representations of the one or more first terms.

According to one or more embodiments, the above-described system can be implemented as a computer program product for facilitating spurious relationship filtration. The computer program product can comprise a computer readable storage medium having program instructions embodied therewith. The program instructions can be executable by a processing component, which can cause the processing component to generate the context-based embedding that yields vector representations of the one or more first terms and filter out the relationship based on the vector representations of the one or more first terms.

One or more embodiments of the subject claimed innovation can solve the spurious relationship problem that plagues the prior art. As mentioned above, conventional systems treat the external knowledge graph as infallible; they simply retrieve a relationship (e.g., hypernymy, hyponymy, synonymy, antonymy, partonomy, supplier, entailment, and so on) in the knowledge graph between nodes that match the extracted terms, without checking whether the relationship applies or is relevant to the extracted terms as the terms are used in the input corpus. The subject claimed innovation, on the other hand, recognizes that the knowledge graph can be imperfect for the input corpus (e.g., can contain relationships that are true but irrelevant or not applicable to the terms as used in the corpus). Specifically, the subject claimed innovation can analyze, via distributional semantics, how the input corpus uses the extracted terms in order to identify and filter out spurious relationships. To this end, the subject claimed innovation can generate a word embedding of terms extracted from the input corpus. The word embedding can map the extracted terms from the corpus to a multi-dimensional vector space, where each extracted term from the input corpus can have its own vector. This word embedding can be context-based, meaning that each term's vector can be based on the context of the term in the input corpus (e.g., based on the words that surround or are near to the term each time the term is used in the corpus). Examples of such embeddings include Word2Vec, Continuous Bag of Words, Skip Gram, GloVe (Global Vectors), BERT (Bidirectional Encoder Representations from Transformers), and so on. Moreover, the word embedding can be trained to detect, capture, or predict a relation between the corpus terms, where the relation that the embedding is trained to capture can correspond to the relationship retrieved from the knowledge graph. In other words, the subject claimed innovation can analyze the corpus semantics, as captured in the embeddings, to determine whether the extracted terms are used/distributed throughout the corpus in a manner that is consistent with the existence of the relationship retrieved from the knowledge graph. For instance, an embedding that is trained to capture a hypernymy relation can be used to determine whether a hypernymy relationship retrieved from the knowledge graph is relevant. Similarly, an embedding that is trained to capture a partonomy relation can be used to determine whether a partonomy relationship retrieved from the knowledge graph is relevant. Based on the embedding, the vectors of two or more extracted terms can be compared (e.g., via cosine similarity, Euclidean distance, and so on). If this comparison shows that the extracted terms are insufficiently similar as used in the input corpus (e.g., a similarity value is below a threshold), the relationship retrieved between nodes in the knowledge graph that correspond to the extracted terms can be filtered out as irrelevant.

In all, the subject claimed innovation can use distributional dissimilarity of terms in a corpus to estimate if a relationship retrieved from a knowledge graph is the same as how the terms are actually related as they are used in the corpus. The subject claimed innovation can filter out spurious relationships based on the distributional semantics of the input corpus as captured in a trained word embedding. Conventional systems simply do not use word embeddings of a text corpus to filter out spurious or irrelevant relationships from a knowledge graph. Thus, the subject claimed innovation can solve a major technical problem in the field of domain database or taxonomy construction.

DETAILED DESCRIPTION

Figure 1:
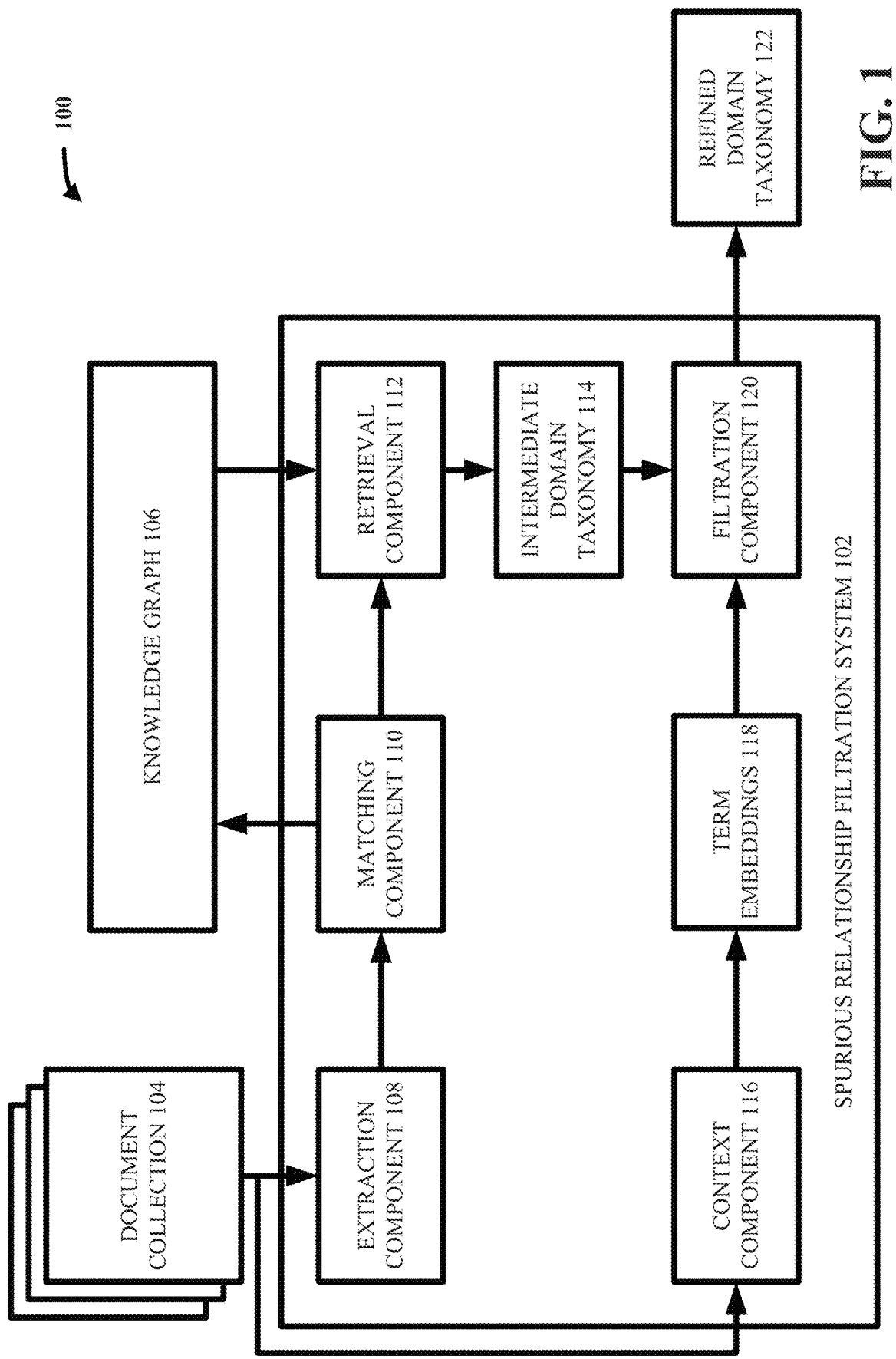
FIG. 1 illustrates a high-level block diagram of an example, non-limiting system that facilitates spurious relationship filtration in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Extracting specific relations, such as hypernymy or hyponymy (e.g., IsA pairs, InstanceOf pairs), synonymy (e.g., SameAs pairs), antonymy (e.g., OppositeOf pairs), partonomy (e.g., HasA pairs), and so on, from a text collection (e.g., input corpus) can help in organizing and searching information hierarchically or in graph structures. Such extraction of relations between terms in a text collection can be used to build a domain taxonomy or domain database for searching or querying the text collection. Generally, such relations are identified simply by extracting terms from the text collection, matching or linking the terms to an external knowledge graph, and retrieving a relationship between nodes of the knowledge graph that correspond to the extracted terms. However, such approach often results in the inclusion of spurious relationships in the constructed taxonomy or database. A spurious relationship is one that, while true in some linguistic contexts, is not applicable or relevant in the context of the text collection. Spurious relationships can lead to the construction of taxonomies or databases that are cluttered with extraneous, immaterial, or unrelated information, which results in taxonomies or databases that mischaracterize the text collection or corpus.

Embodiments described herein include systems, computer-implemented methods, apparatus and/or computer program products that facilitate filtration of spurious relationships from external knowledge graphs or constructed domain taxonomies or databases based on distributional semantics of an input corpus. In one or more embodiments, terms can be extracted from an input corpus. The extracted terms can be linked or matched to nodes in an external knowledge graph (e.g., an extracted term can be found in a label, description, definition, or other text associated with a node of the knowledge graph). In various aspects, a relationship between the matched nodes in the knowledge graph can be retrieved, and a domain taxonomy or database can be constructed that indicates that the extracted terms have the retrieved relationship between them. In one or more embodiments, the retrieved relationship can be determined to be spurious, and thus filtered out, by analyzing the distributional semantics of the input corpus. In various instances, this analysis can be facilitated by generating a context-based embedding of terms in the input corpus. The context-based embedding can map the terms in the corpus to a vector space, where each term can be assigned a unique vector representation, and where each term's vector representation can be based on the context of the term as used in the corpus (e.g., based on the words that surround or are located near the term when the term appears in the corpus). In various aspects, the embedding can be trained to detect, capture, or predict particular relations between terms in the corpus (e.g., trained to capture hypernymy relations, trained to capture synonymy relations, and so on). In one or more embodiments, the retrieved relationship can be filtered out of the knowledge graph or the constructed domain database or taxonomy if a similarity value is less than a threshold. In various instances, the similarity value can be a function of (e.g., mathematically computed based on) the vector representations of the extracted terms. Nonlimiting, exemplary operations that can be used to generate the similarity value can include cosine similarity between the vector representations, average pairwise cosine similarity between the vector representations, cosine similarity with a prototypical term in the corpus, Euclidean distance between the vector representations, and so on. If the similarity value is below the threshold, that can indicate that the extracted terms are used in the corpus in insufficiently similar ways, which can suggest that the relationship retrieved from the knowledge graph does not apply in the context of the corpus. Thus, the retrieved relationship can be filtered out, which can result in a more accurate constructed domain taxonomy or database.

Various embodiments of the subject claimed innovation can be employed to use hardware and/or software to solve problems that are highly technical in nature (e.g., to facilitate the automated construction of a domain taxonomy or database without spurious relationships), that are not abstract and that cannot be performed as a set of mental acts by a human. Further, some of the processes performed can be performed by a specialized computer (e.g., trained word embedder, cosine similarity calculator, and so on) for carrying out defined tasks related to taxonomy or database construction (e.g., generation of a context-based word embedding to capture distributional semantics of a corpus, computation of cosine similarities based on the word embedding to filter out spurious relations, and so on). In various embodiments, the subject claimed innovation can be employed to solve new problems that arise through advancements in technology, computer networks, the Internet, and the like. In various aspects, the subject claimed innovation can provide technical improvements to the field of taxonomy or database construction for searching or querying a text collection, by filtering out spurious relationships based on the distributional semantics of the text collection. By comparing similarities of context-based term embeddings in the text collection, the subject claimed innovation can determine whether two or more terms, which an external knowledge graph indicates are related in some sense, actually are related as the terms are used in the text collection. If the compared term embeddings are insufficiently similar, this suggests that the relationship retrieved from the knowledge graph is irrelevant/spurious, and so the retrieved relationship can be filtered out. Such filtration of spurious relationships based on similarities of term embeddings constitutes a concrete and tangible technical improvement in the prior art.

FIG. 1 illustrates a high-level block diagram of an example, non-limiting system 100 that can facilitate spurious relationship filtration in accordance with one or more embodiments described herein. As shown, a spurious relationship filtration system 102 can generate a domain taxonomy (or domain database) that can be used for searching or querying a document collection 104 (e.g., an input corpus, a text collection, and so on) by leveraging an external knowledge graph 106 (e.g., WordNet, DBpedia, ConceptNet, Wikidata, and so on). Those of ordinary skill in the art will appreciate that, while only a single document collection 104 and a single knowledge graph 106 are depicted in FIG. 1, various embodiments of the subject claimed innovation can be employed with any number of document collections (e.g., distributed document collections) and/or any number of knowledge graphs (e.g., distributed knowledge graphs).

In some aspects, the spurious relationship filtration system 102 can, via an extraction component 108, extract one or more terms (e.g., words, phrases, numbers, other alphanumeric objects, and so on) from the document collection 104. In various instances, the extraction component 108 can employ any linguistic processing methodology now known or later created to facilitate extraction of the terms from the document collection 104 (e.g., part of speech tagging, phrase chunking, and so on). In one or more embodiments, the spurious relationship filtration system 102 can, via a matching component 110, match or link the extracted terms to labels, descriptions, definitions, or other text associated with nodes in the knowledge graph 106. In various aspects, the matching component 110 can match or link the extracted terms to the labels, descriptions, or definitions of nodes in the knowledge graph 106 by employing any suitable methodology now known or later created (e.g., a lexical methodology, orthographical methodology, morphological methodology, syntactic methodology, semantic methodology, and so on). In one or more instances, the spurious relationship filtration system 102 can, via a retrieval component 112, retrieve from the knowledge graph 106 one or more relationships between the identified nodes (e.g., the nodes that match the extracted terms). The retrieval component 112 can facilitate such retrieval by employing any graph querying methodology now known or later created. Based on the relationships retrieved by the retrieval component 112, the spurious relationship filtration system 102 can generate an intermediate domain taxonomy 114 (or intermediate domain database) corresponding to the document collection 104. Since the knowledge graph 106 can be imperfect for the document collection 104 (e.g., the document collection 104 can be a set of documents or files that pertain to technical support for a computer software program, while the knowledge graph 106 can be a graph database that pertains to certain medical information for use by medical researchers), the intermediate domain taxonomy 114 can contain spurious relationships (e.g., relationships that are inapplicable or irrelevant to the extracted terms in the sense in which the terms are used in the document collection 104). Because a purpose of the intermediate domain taxonomy 114 can be to provide a hierarchical structure that characterizes the document collection 104 and which can be used to search or query the document collection 104, the presence of spurious relationships renders the intermediate domain taxonomy 114 suboptimal.

In one or more embodiments, the subject claimed innovation can filter out such spurious relationships based on distributional semantics of the document collection 104, as described below. In various instances, the spurious relationship filtration system 102 can, via a context component 116, generate a context-based word embedding of terms in the document collection 104. In some embodiments, any set or subset of terms in, but not extracted from, the document collection 104 and/or any set or subset of terms extracted from the document collection 104 can be embedded by the context component 116. The word embedding can, in various embodiments, map terms in the document collection 104 to a multi-dimensional vector space, such that each embedded term can have a vector representation in the vector-space. Term embeddings 118 can correspond to these vector representations.

In various aspects, the context component 116 can generate the embedding by taking into account the context of terms in the document collection 104. One having ordinary skill in the art will recognize that this can be considered an application of the field of distributional semantics, which can leverage the distribution of terms in a corpus to uncover the terms' meanings. In some embodiments, the context component 116 can generate the term embeddings 118 based on a paradigmatic approach. In such embodiments, the context component 116 can construct the vector representation of a particular term in the document collection 104 based on the terms that it co-occurs with (e.g., based on other terms in the document collection 104 that surround or are located near the particular term when the particular term appears or is used in the document collection 104). In some embodiments, any other distributional semantics approach now known or later created can be implemented (e.g., topical approach, syntagmatic approach, and so on). One having ordinary skill in the art will also appreciate that the context component 116 can, in various instances, employ any word embedding methodology now known or later created (e.g., Word2Vec, Continuous Bag of Words, Skip Gram, GloVe (Global Vectors), BERT (Bidirectional Encoder Representations from Transformers), other types of neural-network-based or machine-learning-based embedding techniques, and so on). In some embodiments, any word embedding methodology that captures any distributional semantics of the document collection 104 can be implemented within the scope of the subject claimed innovation (e.g., co-occurrence matrix methodology, and so on).

In various embodiments, the context-component 116 can be trained to generate a context-based word embedding that detects, captures, or predicts one or more particular relations (e.g., hypernymy, hyponymy, synonymy, antonymy, partonomy, supplier, entailment, and so on) between terms in the document collection 104. For instance, the context component 116 can, in some embodiments, be trained (e.g., via supervised learning, unsupervised learning, reinforcement learning, and so on) to detect, capture, or predict a hypernymy relation. In such case, the context component 116 can generate vector representations (e.g., term embeddings 118) such that two terms from the document collection 104 that have sufficiently similar vector representations likely have a hypernymy relation between them. On the other hand, if the vector representations of those two terms are insufficiently similar, this can indicate that the two terms likely do not have a hypernymy relation between them. Such term embeddings 118 can be compared to determine whether a hypernymy relationship retrieved from the knowledge graph 106 for those two terms is spurious. In another example, if the context component 116 is trained to detect, capture, or predict a supplier relation, it can generate vector representations (e.g., term embeddings 118) such that two terms from the document collection 104 that have similar vector representations likely have a supplier relation between them. On the other hand, if the vector representations between those two terms are not sufficiently similar, this can indicate that the two terms likely do not have a supplier relation between them. Such term embeddings 118 can be compared to determine whether a supplier relationship retrieved from the knowledge graph 106 for those two terms is spurious. In some embodiments, the context component 116 can be trained to detect, capture, or predict a plurality of types of relations, or can have different modes, where each mode is trained to predict a different type of relation and where a mode can be selected based on the relationship retrieved from the knowledge graph 106 (e.g., if a partonomy relationship is retrieved from the knowledge graph 106, the context component 116 can generate a word embedding trained to capture partonomy relations; if an entailment relationship is retrieved from the knowledge graph 106, the context component 116 can generate a word embedding trained to capture entailment relations; and so on).

In various embodiments, the spurious relationship filtration system 102 can, via a filtration component 120, filter out from the intermediate domain taxonomy 114 a relationship retrieved from the knowledge graph 106 based on an analysis of the term embeddings 118. This can result in a refined domain taxonomy 122, which can lack the spurious relationships that were listed in the intermediate domain taxonomy 114. In one or more instances, the filtration component 120 can perform the filtration based on a similarity value being less than a threshold. One having ordinary skill in the art will appreciate that, as used herein, the phrases "sufficiently similar" or "insufficiently similar" can refer to the similarity value being above and/or below the threshold, depending on whether higher values or lower values indicate more similarity. In some aspects, the threshold can be any value. In some aspects, the threshold value can vary with application. In various instances, the filtration component 120 can compute the similarity value based on the term embeddings 118 (e.g., by performing one or more mathematical operations on the vector representations of the embedded terms from the document collection 104). In some embodiments, the filtration component 120 can filter out a relationship between two terms based on a cosine similarity of the vector representations of those two terms being below the threshold. In some embodiments, the filtration component 120 can filter out a relationship between two terms based on a Euclidean distance between the vector representations of those two terms being below the threshold. In some embodiments, the filtration component 120 can filter out a relationship between two or more terms based on average pairwise cosine similarities of the vector representations of those two or more terms being below the threshold. In some embodiments, the filtration component 120 can filter out a relationship between two or more terms based on cosine similarities of the vector representations of those two or more terms with a vector representation of a prototypical term in the document collection 104 being less than the threshold.

As explained above, the spurious relationship filtration system 102 can generate, based on the document collection 104 and the knowledge graph 106, the refined domain taxonomy 122 which can be used for searching or querying the document collection 104. Since the refined domain taxonomy 122 can lack spurious relationships, it is not cluttered with extraneous or inapplicable information and thus can better characterize the document collection 104.

To clarify FIG. 1, consider the following nonlimiting example. Suppose that the document collection 104 comprises a set of documents, files, and/or text that pertain to technical support for the Google Chrome internet browser. Further, suppose that the terms "browser," "chrome," and "links" appear in the document collection 104. For instance, the document collection 104 can have one or more sentences such as "Upon entering a search, the Chrome browser displays results as clickable internet links," and so on. The extraction component 108 can extract (e.g., identify) the terms "browser", "chrome," and "links" from the document collection 104. The matching component 110 can then match the terms to labels, descriptions, or definitions of nodes in the knowledge graph 106. For instance, the matching component 110 can match (e.g., lexically, orthographically, morphologically, syntactically, semantically, and so on) the term "browser" from the document collection 104 to a word "browser" that appears in a label, description, or definition of a node in the knowledge graph 106, where the node can represent "Web Browsers," "Internet Browsers," or the like. Similarly, the matching component 110 can also match the term "chrome" and the term "links" to labels, descriptions, or definitions of respective nodes in the knowledge graph 106. The retrieval component 112 can then retrieve from the knowledge graph 106 one or more relationships between the node associated with the term "browser", the node associated with the term "chrome," and/or the node associated with the term "links," and the intermediate domain taxonomy 114 can be generated based on those retrieved relationships. For example, the retrieval component 112 can retrieve a hypernymy-hyponymy relationship from the knowledge graph 106 between the node associated with the term "browser" and the node associated with the term "chrome." This retrieved relationship can indicate that "chrome" is a hyponym of "browser" and/or that "browser" is a hypernym of "chrome." Indeed, this relationship is true since Google Chrome is a type or species of Internet Browser. Moreover, this relationship is relevant since the document collection 104, in this nonlimiting example, is a technical support corpus that provides information to assist in the use of Google Chrome. Likewise, the retrieval component 112 can retrieve a hypernymy-hyponymy relationship from the knowledge graph 106 between the node associated with the term "browser" and the node associated with the term "links." This retrieved relationship can indicate that "links" is a hyponym of "browser" and/or that "browser" is a hypernym of "links." This relationship is technically true since the open source web system Links is, indeed, a type or species of Internet Browser. However, this relationship is irrelevant and/or not applicable to the document collection 104 since the document collection 104, in this nonlimiting example, does not use the term "links" to refer to the Links Browser; instead, the document collection 104 uses the term "links" to refer to clickable internet hyperlinks that are outputted after a search by Google Chrome. Thus, the retrieved hypernymy-hyponymy relationship between the term "links" and the term "browser" is spurious.

The spurious relationship filtration system 102 can then identify and filter out this spurious relationship from the intermediate domain taxonomy 114, as described above. For instance, the context component 116 can capture the distributional semantics of the document collection 104 by generating, via any known word embedding methodology, a context-based word embedding of terms that appear in the document collection 104. This can map terms in the document collection 104 to vectors, where each term's vector is based on the words, numbers, and/or other symbols that surround or are near the term when the term appears in the document collection 104. In this nonlimiting example, the context component 116 can utilize machine learning approaches (e.g., Word2Vec, Continuous Bag of Words, Skip Gram, GloVe (Global Vectors), BERT (Bidirectional Encoder Representations from Transformers), and so on) and can be trained to detect, capture, or predict hypernymy-hyponymy relations. That is, the context component 116 can be trained (e.g., via supervised training, unsupervised training, reinforcement learning, and so on) to map terms in the document collection 104 to vectors (e.g., term embeddings 118), such that if two embedded terms have sufficiently similar vectors (e.g., similarity value above a threshold, where any suitable threshold can be chosen based on the application), the two terms likely have a hypernymy-hyponymy relation between them. This act of generating a context-based embedding of terms in the document collection 104 allows the spurious relationship filtration system 102 to capture the distributional semantics of the document collection 104 (e.g., to determine how or in what linguistic sense the document collection 104 uses particular terms).

The spurious relationship filtration system 102 can then, via the filtration component 120, filter out from the intermediate domain taxonomy 114 any spurious relationship based on a similarity value being less than a threshold. In this nonlimiting example, the filtration component 120 can compute, as the similarity value, a cosine similarity (e.g., cosine of the angle between vectors) between the vector representing the term "browser" and the vector representing the term "chrome." This similarity value can be above a threshold, which can mean that the term "browser" and the term "chrome," as used in the document collection 104, likely have a hypernymy-hyponymy relation between them, since the context component 116 can be trained to capture hypernymy-hyponymy relations. In other words, the similarity value being above the threshold can indicate that the document collection 104 uses (e.g., distributes) the term "browser" and the term "chrome" in a way that is sufficiently consistent with how known corpuses (e.g., training sets) distribute known hypernyms and hyponyms. Since the distribution of the term "browser" and the term "chrome" in the document collection 104 is consistent with these known distributions of hypernyms and hyponyms in known corpuses, the terms "browser" and "chrome," as used in the document collection 104, likely have a hypernymy-hyponymy relation between them. Thus, the hypernymy-hyponymy relationship between the term "browser" and the term "chrome" retrieved from the knowledge graph 106 can be retained.

Similarly, the filtration component 120 can compute, as the similarity value, a cosine similarity between the vector representing the term "browser" and the vector representing the term "links." This similarity value can be below a threshold, which can mean that the term "browser" and the term "links," as used in the document collection 104, likely do not have a hypernymy-hyponymy relation between them, since the context component 116 can be trained to capture hypernymy-hyponymy relations. In other words, the similarity value being below the threshold can indicate that the document collection 104 distributes the term "browser" and the term "links" in a way that is not sufficiently consistent with how known corpuses (e.g., training sets) distribute known hypernyms and hyponyms. Since the distribution of the term "browser" and the distribution of the term "links" in the document collection 104 is not consistent with these known distributions of hypernyms and hyponyms in known corpuses, the terms "browser" and "links," as used in the document collection 104, likely do not have a hypernymy-hyponymy relation between them. Thus, the hypernymy-hyponymy relationship between the term "browser" and the term "links" retrieved from the knowledge graph 106 can be filtered out as spurious. This can result in the refined domain taxonomy 122.

As a simplified and nonlimiting explanation, the subject claimed innovation can use word embeddings that are trained to detect a particular relation between terms to analyze the distribution of terms in a corpus. The word embeddings can reveal that two particular terms in the corpus likely do not have the particular relation between them (e.g., the particular terms are distributed throughout the corpus in a way that is inconsistent with how terms known to be related in this way are usually distributed). In such case, a relationship retrieved from a knowledge graph that indicates that the particular terms have the particular relation can be filtered out or disregarded as spurious. In other words, the subject claimed innovation uses word embeddings of a corpus to determine whether a retrieved relationship in a knowledge graph is relevant.

Figure 2:
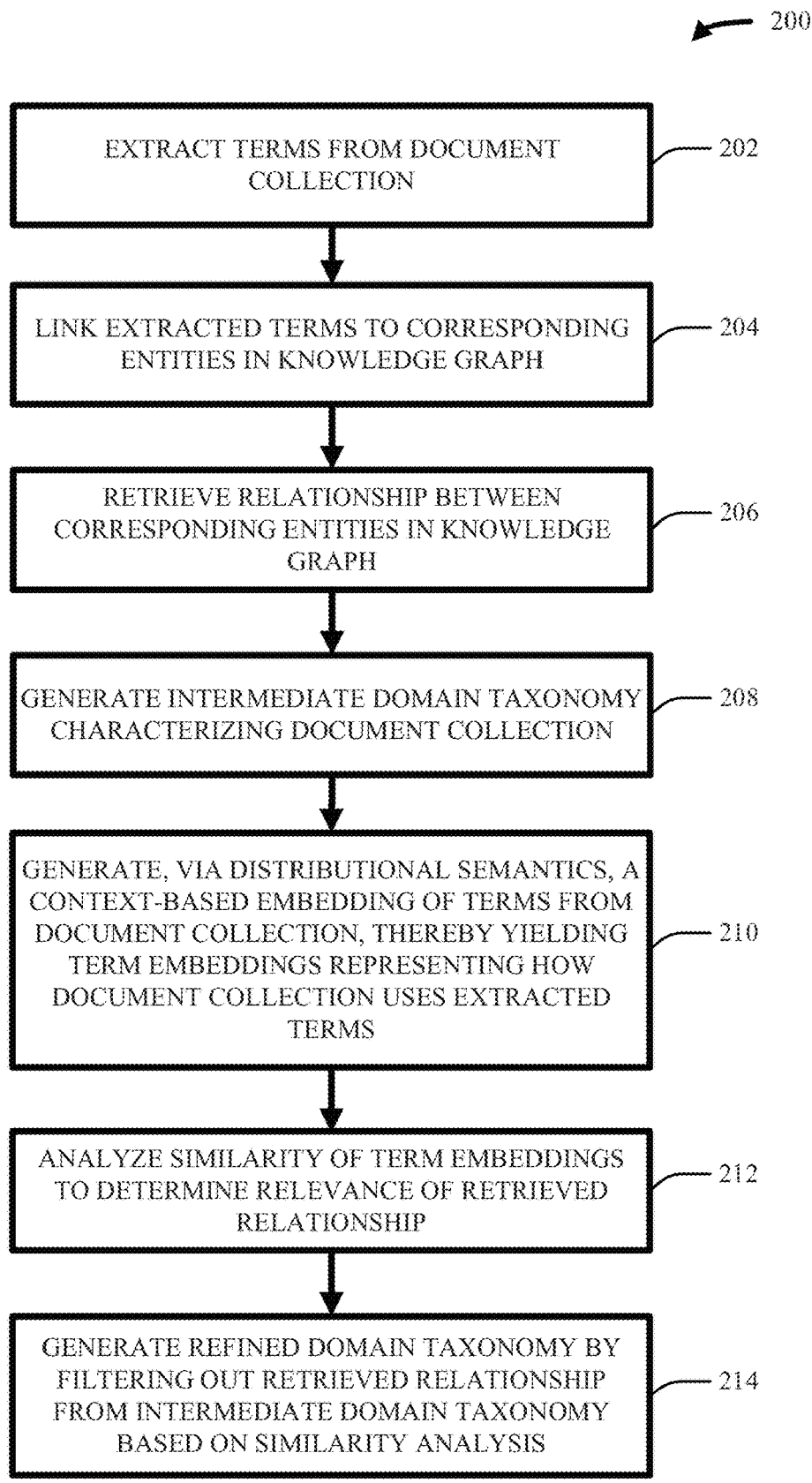
FIG. 2 illustrates a high-level flow diagram of an example, non-limiting computer-implemented method that facilitates spurious relationship filtration in accordance with one or more embodiments described herein.

FIG. 2 illustrates a high-level flow diagram of an example, non-limiting computer-implemented method 200 that can facilitate spurious relationship filtration in accordance with one or more embodiments described herein. In various embodiments, the computer-implemented method 200 can be facilitated by the system 100 depicted in FIG. 1.

At act 202, terms (e.g., "browser," "chrome," "links," and so on) can be extracted from a document collection (e.g., document collection 104, input corpus, text collection, and so on). At act 204, the extracted terms can be linked or matched to corresponding entities in a knowledge graph (e.g., knowledge graph 106). As explained above, the extracted terms can be matched to words, phrases, numbers, and/or other alphanumeric objects that appear in labels, descriptions, definitions, or other text associated with nodes in the knowledge graph (e.g., the term "browser" from the document collection 104 being matched to the word "browser" that appears in a label, description, or definition of an "Internet Browser" node in the knowledge graph 106). At act 206, a relationship can be retrieved between the corresponding entities in the knowledge graph (e.g., the hypernymy-hyponymy relationship being retrieved between the node that is matched with the term "browser" and the node that is matched with the term "links"). At act 208, an intermediate domain taxonomy (e.g., intermediate domain taxonomy 114) can be generated based on the retrieved relationship, where the intermediate domain taxonomy can characterize the document collection (e.g., hierarchical taxonomy or database with the purpose of being used to search or query the document collection). At act 210, a context-based embedding of terms from the document collection can be generated via distributional semantics. This can yield term embeddings (e.g., term embeddings 118, vector representations, and so on) that can represent how the document collection uses (e.g., distributes) the extracted terms. As explained above, the context-based embedding can be trained to detect particular relations between terms in the document collection based on how those terms are distributed throughout the document collection. At act 212, a similarity of term embeddings can be analyzed (e.g., cosine similarity, Euclidean distance, and so on) to determine the relevance of the retrieved relationship. At act 214, a refined domain taxonomy (e.g., refined domain taxonomy 122) can be generated by filtering out (e.g., via filtration component 120) the retrieved relationship from the intermediate domain taxonomy based on the similarity analysis (e.g., filter out if the similarity value is below a threshold).

Figure 3:
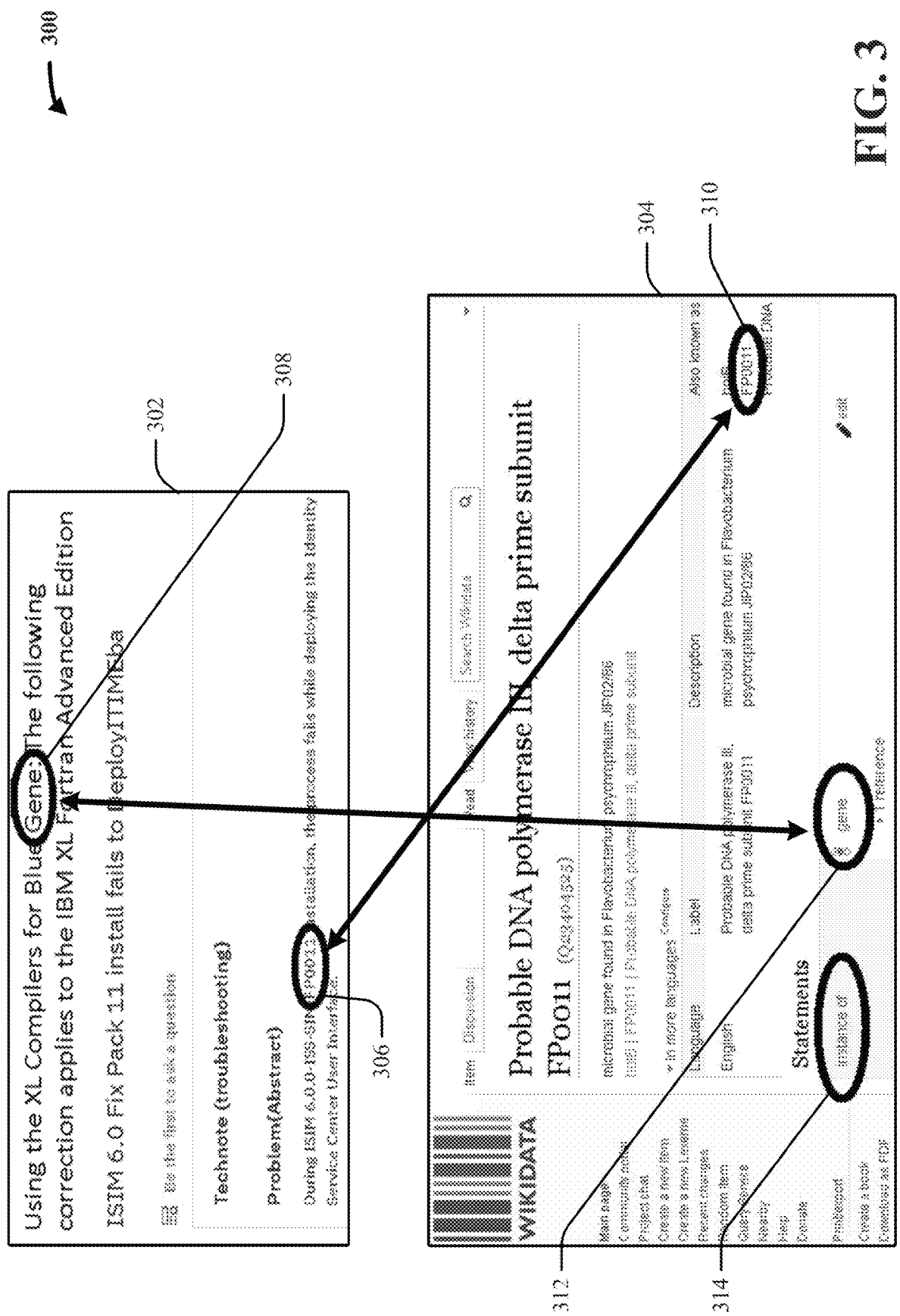
FIG. 3 illustrates an example, non-limiting diagram that depicts a problem of spurious relationships which one or more embodiments described herein can solve.

FIG. 3 illustrates an example, non-limiting diagram 300 that depicts a problem of spurious relationships which one or more embodiments described herein can solve. As shown, FIG. 3 depicts a screenshot 302 of an input corpus and a screenshot 304 of a knowledge graph. The screenshot 302 can be of a particular technical input corpus (e.g., IBM Technotes), and the screenshot 304 can be of a particular external knowledge graph (e.g., Wikidata). Those of ordinary skill in the art will appreciate that any other input corpus and/or any other knowledge graph can be used. As shown, a term 306 (e.g., "FP0011") can be extracted (e.g., via extraction component 108) from the input corpus, and a term 308 (e.g., "gene") can also be extracted from the input corpus. As shown, the term 306 (e.g., "FP0011") can be matched (e.g., via matching component 110) to a word 310 (e.g., "FP0011") that is part of a label, description, or definition of a node in the knowledge graph, and the term 308 (e.g., "gene") can be matched to a word 312 (e.g., "gene") that is part of a label, description, or definition of another node in the knowledge graph. As shown, a relationship 314 (e.g., "Instance Of") can be retrieved from the knowledge graph between the node corresponding to term 306 (e.g., the node associated with "FP0011") and the node corresponding to term 308 (e.g., the node associated with "gene"). In various embodiments, the relationship 314 can be spurious (e.g., true but irrelevant to the input corpus).

Consider the simplified and nonlimiting explanation of FIG. 3 that follows. The input corpus can be IBM Technotes, which provides troubleshooting information for IBM customers. Screenshot 302 depicts a particular page from IBM Technotes; a page pertaining to troubleshooting of "Blue Gene," which is a type of computer software product provided by IBM. As shown in screenshot 302, one particular term that appears in the IBM Technotes page pertaining to the Blue Gene computer program is "FP0011," which is a type of computer error code associated with the Blue Gene computer program. Interestingly, the alphanumeric object "FP0011" is also a name and/or representation of a particular segment of DNA polymerase (e.g., a gene) in microbes. Indeed, this relationship is stored in the Wikidata knowledge graph, as shown in screenshot 304. While such a relationship is technically true in one linguistic sense (e.g., FP0011 is, in fact, a type of microbial gene), it is not relevant at all to the terms "FP0011" (e.g., 306) and "gene" (e.g., 308) as they are used in the IBM Technotes corpus. After all, IBM Technotes has nothing to do with microbial genetics. Thus, the InstanceOf relationship (e.g., 314) that is retrieved from Wikidata is spurious in the context of the IBM Technotes corpus (e.g., "FP0011" and "gene" are not used in the corpus to refer to the field of biological genetics). As explained above in connection with FIGS. 1-2 and as explained below in connection with the remaining figures, the subject claimed innovation can identify and filter out such spurious relationships, unlike conventional systems/techniques for constructing domain taxonomies or databases.

Figure 4:
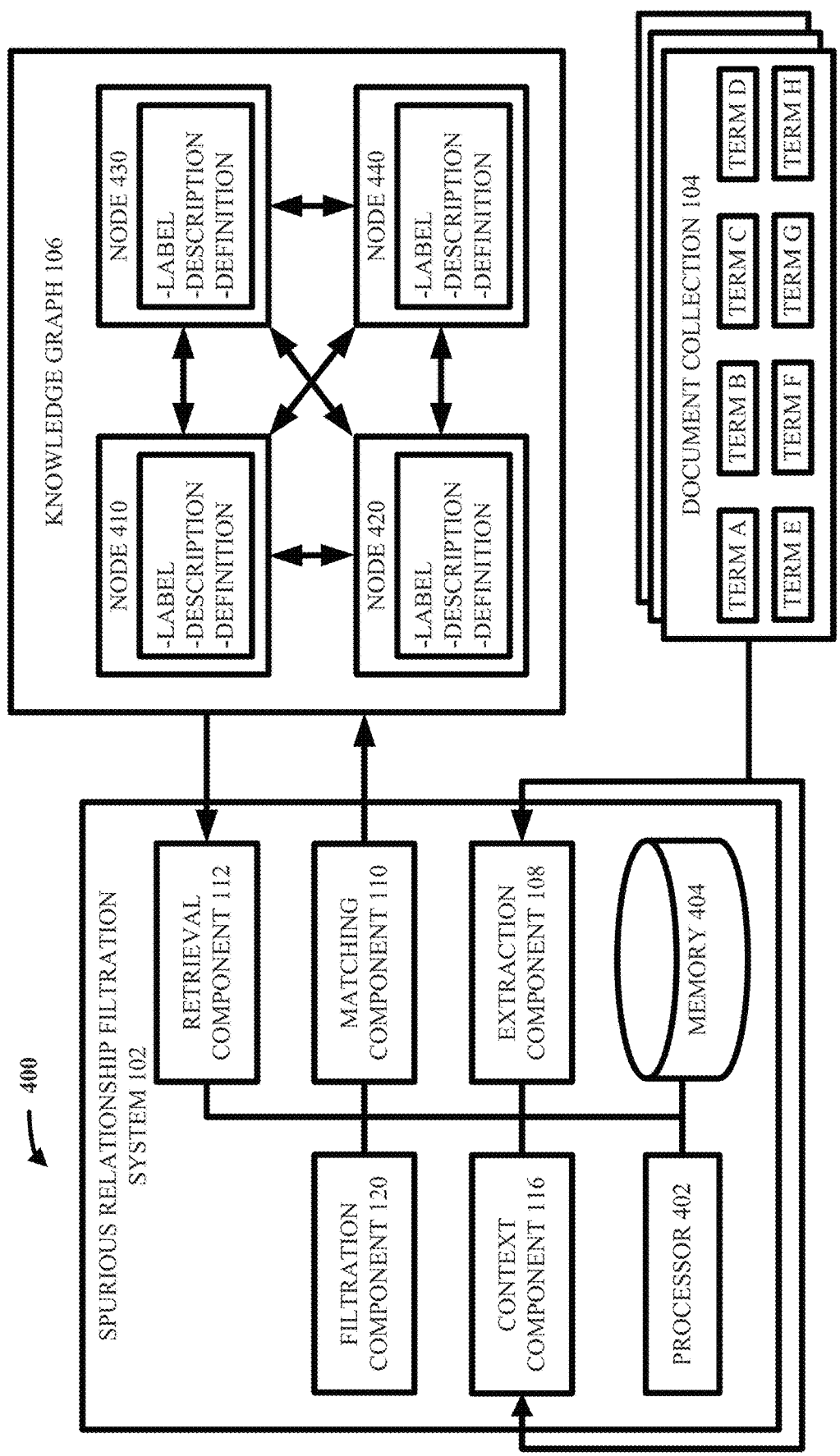
FIG. 4 illustrates a block diagram of an example, non-limiting system that facilitates spurious relationship filtration in accordance with one or more embodiments described herein.

FIG. 4 illustrates a block diagram of an example, non-limiting system 400 that can facilitate spurious relationship filtration in accordance with one or more embodiments described herein. As shown, FIG. 4 depicts the spurious relationship filtration system 102 that can detect and/or filter out spurious relationships retrieved from the knowledge graph 106 based on distributional semantics of the document collection 104.

In various embodiments, the spurious relationship filtration system 102 can comprise a processor 402 (e.g., computer processing unit, microprocessor, and so on) and a computer-readable memory 404 that is operably connected to the processor 402. The memory 404 can store computer-executable instructions which, upon execution by the processor 402, can cause the processor 402 and/or other components of the spurious relationship filtration system 102 (e.g., extraction component 108, matching component 110, retrieval component 112, context component 116, filtration component 120, and so on) to perform one or more acts. In various embodiments, the memory 404 can store computer-executable components (e.g., extraction component 108, matching component 110, retrieval component 112, context component 116, filtration component 120, and so on), and the processor 402 can execute the computer-executable components.

As shown, the document collection 104 can contain one or more terms (e.g., Term A, Term B, Term C, Term D, Term E, Term F, Term G, Term H, and so on). In various embodiments, these terms can represent words, phrases, numbers, alphanumeric objects, and/or other text or symbols that appear in the document collection 104. Although only eight terms (e.g., Term A through Term H) are depicted in FIG. 4, one having ordinary skill in the art will appreciate that any number of terms can appear in the document collection 104. One having ordinary skill in the art will also appreciate that one or more of the Terms A through H can, in various embodiments, appear multiple times throughout the document collection 104.

As shown, the knowledge graph 106 can contain one or more nodes (e.g., Node 410, Node 420, Node 430, Node 440, and so on). These nodes can correspond to entities or vertices in the knowledge graph 106 and can have one or more relationships (e.g., edges) with each other. These relationships can be denoted by the double-arrows connecting the nodes in the knowledge graph 106. Although FIG. 4 depicts the knowledge graph 106 as having only four nodes (e.g., Node 410 through Node 440) that are fully connected with bidirectional relationships, one having ordinary skill in the art will appreciate that the knowledge graph 106 can have any number of nodes and that the nodes can have any number and/or any types of directional and/or nondirectional relationships between and/or among them. As depicted, the nodes in the knowledge graph 106 can have corresponding labels, descriptions, definitions, and/or other text associated with them. As used herein, the phrase "knowledge terms" is used to refer to these labels, descriptions, definitions, and/or other text.

As explained above, the spurious relationship filtration system 102 can extract, via the extraction component 108, one or more terms from the document collection 104. That is, the extraction component 108 can extract (e.g., recognize, identify, detect, mine, and so on) one or more of Terms A through H from the document collection 104. In one or more embodiments, the extraction component 108 can facilitate such extraction by employing any suitable linguistic processing methodology now known or later created (e.g., part of speech tagging, phrase chunking, and so on). In a non-limiting example, the extraction component 108 can extract Term C, Term F, and Term H from the document collection 104, meaning that the extraction component 108 can identify that the document collection 104 contains Term C, Term F, and Term H.

In various aspects, the spurious relationship filtration system 102 can match or link, via the matching component 110, the extracted terms to knowledge terms (e.g., labels, descriptions, definitions, and/or other text) associated with nodes in the knowledge graph 106. That is, the matching component 110 can search and/or query the nodes of the knowledge graph 106 to identify particular nodes that correspond to the extracted terms. If the matching component can identify a word in a label, description, and/or definition of a node in the knowledge graph 106, where that word matches an extracted term, that particular node can be said to correspond to that particular extracted term. As mentioned above, the matching component 110 can facilitate this matching by employing any suitable methodology now known or later created (e.g., lexically, orthographically, morphologically, syntactically, semantically, and so on). To continue the above example where Term C, Term F, and Term H are extracted, the matching component 110 can search through the nodes of the knowledge graph 106 and determine that Node 410 has a label that contains a word matching Term C (e.g., where Term C appears in both the document collection 104 and the label of Node 410 in the knowledge graph 106). In such case, Term C can be said to correspond to Node 410. Similarly, the matching component 110 can determine that Term F matches a word in the description of Node 430, and so Term F can be said to correspond to Node 430. Likewise, the matching component 110 can determine that Term H matches a word in the definition of Node 440, and so Term H can be said to correspond to Node 440.

In various instances, the spurious relationship filtration system 102 can retrieve, via the retrieval component 112, one or more relationships between the matched nodes in the knowledge graph 106. That is, the retrieval component 112 can retrieve (e.g., identify, detect, recognize, and so on) a relationship from the knowledge graph 106 that connects two or more of the nodes that correspond to (e.g., that match) the extracted terms. As mentioned above, the retrieval component can facilitate this retrieval by employing any suitable graph querying methodology now known or later created. Those of ordinary skill in the art will appreciate that the retrieved relationships can take any suitable form (e.g., <subterm, relation, superterm>, <subterm 1, subterm 2, subterm 3, . . . , relation>, and so on). To continue the above example where Term C, Term F, and Term H are extracted and respectively correspond to Node 410, Node 430, and Node 440, the retrieval component 112 can determine that Node 410 and Node 430 have a hypernymy relationship between them, where Node 410 is the hyponym and Node 430 is the hypernym. In such case, the spurious relationship filtration system 102 can determine, at least initially, that Term C (which corresponds to Node 410) is a hyponym (e.g., species) of Term F (which corresponds to Node 430). Similarly, the retrieval component 112 can determine that Node 440 also has a hypernymy relationship with Node 430, where Node 440 is the hyponym. In such case, the spurious relationship filtration system 102 can determine, at least initially, that Term H (which corresponds to Node 440) is a hyponym of Term F (which corresponds to Node 430). In various embodiments, the spurious relationship filtration system 102 can generate the intermediate domain taxonomy 114 (not depicted in FIG. 4) based on these retrieved relationships. However, because one or more of these retrieved relationships can be spurious, the intermediate domain taxonomy 114 can be suboptimal.

In one or more embodiments, the spurious relationship filtration system 102 can detect and filter out such spurious relationships by leveraging the distributional semantics of the document collection 104 (e.g., analyzing how the document collection 104 uses/distributes the extracted terms to determine if a relationship retrieved from the knowledge graph 106 is relevant). In other words, the spurious relationship filtration system 102 can use distributional dissimilarity of particular terms in the document collection 104 to estimate if a relationship retrieved from the knowledge graph 106 is the same as how the particular terms actually are related as they are used in the document collection 104. In various aspects, the spurious relationship filtration system 102 can generate, via the context component 116, a context-based embedding of terms from the document collection 104. In some embodiments, only terms that are extracted are embedded. In some embodiments, any and/or every term from the document collection 104 can be embedded, whether or not extracted. Generating an embedding of terms can map the terms to a multi-dimensional vector space, where each embedded term can correspond to its own vector. That is, the context component 116 can assign vectors to terms in the document collection 104 (e.g., a vector assigned to Term A, a vector assigned to Term B, and so on). In various embodiments, the embedding can be context-based, meaning that the vector for a particular embedded term can be generated as a function of other words or terms that surround or are located near the particular term when the particular term appears or is used in the document collection 104. Those of ordinary skill in the art will appreciate that any suitable methodology for facilitating context-based word embedding now known or later created can be employed in various embodiments (e.g., Word2Vec, Continuous Bag of Words, Skip Gram, co-occurrence matrix, GloVe (Global Vectors), BERT (Bidirectional Encoder Representations from Transformers), and so on). To continue the above example where both Term C and Term H are hyponyms of Term F, at least according to the knowledge graph 106, the context component 116 can generate a context-based embedding of terms in the document collection 104, such that terms in the document collection 104 are each assigned a vector. As explained above, each vector can be context-based, meaning that it is designed to capture/encapsulate how its associated term is distributed throughout the document collection 104 and what other terms or words surround it. So, Term C can have its own vector characterizing how it (Term C) is distributed throughout the document collection 104, Term F can have its own vector characterizing how it (Term F) is distributed throughout the document collection 104, and Term H can have its own vector characterizing how it (Term H) is distributed throughout the document collection 104. These vectors can then be used to determine whether the hypernymy relationships retrieved from the knowledge graph 106 are relevant to Term C, Term F, and Term H in the sense in which those terms are actually used in the document collection 104.

In one or more embodiments, the spurious relationship filtration system 102 can, via the filtration component 120, filter out one or more retrieved relationships based on the vector representations of embedded terms. In some cases, the filtration component 120 can compute a similarity value based on the vector representations and can compare that similarity value to a threshold. The threshold can be any suitable value selected by an operator and/or can vary with the application. In various instances, the similarity value can be a function of the vector representations of the embedded terms. Some nonlimiting examples can include cosine similarity between vector representations, Euclidean distance between vector representations, any other suitable mathematical computation or series of mathematical computations or operations (e.g., involving vector dot products, vector cross products), and so on. If the similarity value is above the threshold, this can indicate that the embedded terms are distributed throughout the document collection 104 in ways that are consistent with the relationship retrieved from the knowledge graph 106. In such case, the retrieved relationship can be retained. On the other hand, if the similarity value is below the threshold, this can indicate that the embedded terms are distributed throughout the document collection 104 in ways that are inconsistent with the relationship retrieved from the knowledge graph 106. In such case, the retrieved relationship can be filtered out of the intermediate domain taxonomy 114 (not shown in FIG. 4) and/or filtered out of the knowledge graph 106. In some embodiments, the retrieval component 112 can retrieve a relationship identified in the knowledge graph 106 based on output by the filtration component 120 (e.g., retrieve the relationship only if the similarity value is above the threshold). In such embodiments, the spurious relationship filtration system 102 can be said to be retrieving relationships from the knowledge graph 106 only if the relationships are determined to be relevant.

To continue the above example where Term C, Term F, and Term H each have their own vector representation, the filtration component 120 can compare their vector representations (e.g., via cosine similarity) to determine if the hypernymy relationships retrieved from the knowledge graph 106 are relevant. For instance, the filtration component 120 can compute a cosine similarity between the vector representing Term C and the vector representing Term F. The value of the cosine similarity can be the similarity value discussed above. In some aspects, the similarity value can be above the threshold, which can indicate that the distribution of Term C and the distribution of Term F are consistent with these two terms having a hypernymy relation (e.g., Term C and Term F can be distributed throughout the document collection 104 in a way that suggests that Term C is being used as a hyponym of Term F). In such case, the hypernymy relationship between Term C and Term F that was retrieved from the knowledge graph 106 can be retained. In another aspect, the filtration component 120 can compute a cosine similarity between the vector representing Term H and the vector representing Term F. The value of the cosine similarity can be the similarity value discussed above. In various cases, the similarity value can be below the threshold, which can indicate that the distribution of Term H and the distribution of Term F are not consistent with these two terms having a hypernymy relation (e.g., Term H and Term F can be distributed throughout the document collection 104 in a way that suggests that Term H is not being used as a hyponym of Term F). In such case, the hypernymy relationship between Term H and Term F that was retrieved from the knowledge graph 106 can be filtered out of the intermediate domain taxonomy 114 (not shown in FIG. 4) and/or filtered out of the knowledge graph 106.

Figure 5:
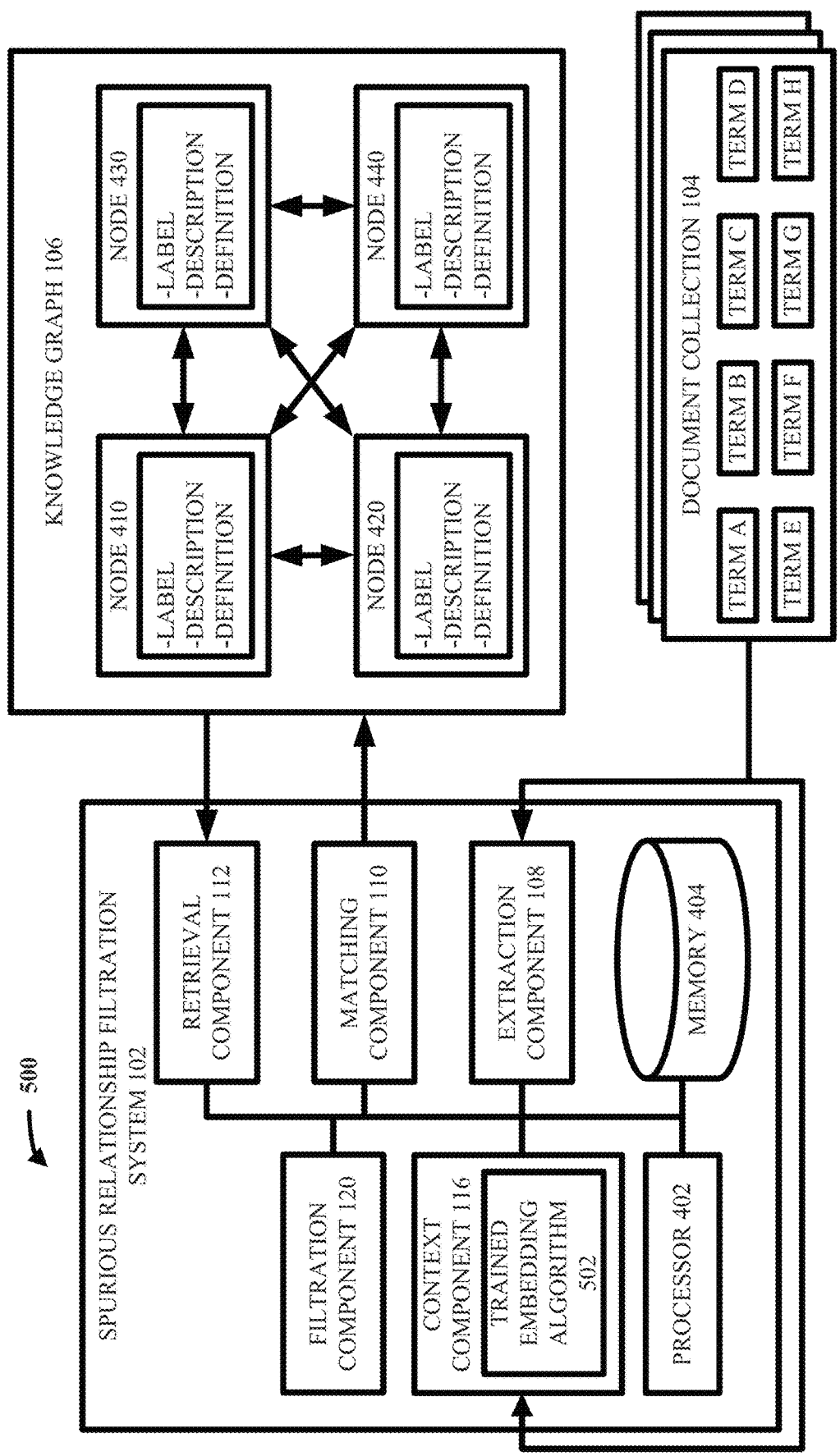
FIG. 5 illustrates a block diagram of an example, non-limiting system including a trained embedding algorithm that facilitates spurious relationship filtration in accordance with one or more embodiments described herein.

FIG. 5 illustrates a block diagram of an example, non-limiting system 500 including a trained embedding algorithm that can facilitate spurious relationship filtration in accordance with one or more embodiments described herein. As shown, the system 500 can, in various embodiments, comprise the same components as the system 400, and can further comprise a trained embedding algorithm 502 employed by the context component 116.

In one or more embodiments, the trained embedding algorithm 502 can employ artificial intelligence and/or machine learning methodologies (e.g., neural networks) to generate word embeddings (e.g., via Word2Vec, Continuous Bag of Words, Skip Gram, GloVe (Global Vectors), BERT (Bidirectional Encoder Representations from Transformers), and so on). Because machine learning can be involved, the trained embedding algorithm 502 can be trained to generate embeddings that detect, capture, and/or predict one or more particular relations between and/or among terms in the document collection 104, based on the distributional semantics of the document collection 104 (e.g., Hearst patterns). In some aspects, the trained embedding algorithm 502 can be trained with supervised learning, unsupervised learning, reinforcement learning, and so on. For instance, the trained embedding algorithm 502 can be trained based on known corpuses (e.g., known document collections), the terms of which have known relationships. During training, the trained embedding algorithm 502 can generate embeddings of terms in the known corpuses (e.g., assign vectors to the terms in the known corpuses). Consider two or more training terms in a known corpus that have a known relation between them. Since the two or more terms have the known relation, they are distributed throughout the known corpus in a way that is consistent with and/or suggests the existence of the known relation. To train, the vectors of those two or more training terms generated by the trained embedding algorithm 502 can be compared (e.g., via cosine similarity, Euclidean distance, and so on). Since the two or more training terms have the known relation between them, the computed similarity values should reflect that fact (e.g., the similarity value should be higher than the threshold if higher values indicate more similarity, or the similarity value should be lower than the threshold if lower values indicate more similarity). If the similarity value does not appropriately convey that the two or more training terms are related, feedback (e.g., indicating the correct similarity level) can be provided to the trained embedding algorithm 502. Similar training can be facilitated using two or more terms that are known to not have a particular relation (e.g., the similarity value should indicate a lack of similarity), and so on. One of ordinary skill in the art will appreciate that any methodology of providing machine-learning feedback now known or later created can be incorporated in various embodiments of the subject claimed innovation (e.g., backpropagation, error function minimization, and so on).

After training, the trained embedding algorithm 502 can, in various instances, generate word embeddings that detect, capture, and/or predict one or more particular relations between terms in the document collection 104. These trained embeddings can be leveraged to determine the relevance of relationships, which can be of the same types as the particular relations, that are retrieved from the knowledge graph 106. For example, suppose that the knowledge graph 106 indicates that there is a partonomy relationship between Term A and Term B in the document collection 104. In such case, the trained embedding algorithm 502 can be trained to generate an embedding that can detect a partonomy relation. That is, the trained embedding algorithm 502 can generate vectors where two similar vectors represent two words that are distributed in a manner consistent with the existence of a partonomy relation between the two words, and where two dissimilar vectors represent two words that are distributed in a manner inconsistent with the existence of a partonomy relation between the two words. The vector assigned to Term A can then be compared with the vector assigned to Term B (e.g., via cosine similarity). If the two vectors are sufficiently similar, that can indicate that Term A and Term B are distributed throughout the document collection 104 in a manner, fashion, or pattern that is consistent with the existence of a partonomy relation between Term A and Term B. In such case, the partonomy relationship retrieved from the knowledge graph 106 between Term A and Term B can be retained. On the other hand, if the two vectors are not sufficiently similar, that can indicate that Term A and Term B are distributed throughout the document collection 104 in a manner, fashion, or pattern that is inconsistent with the existence of a partonomy relation between Term A and Term B. In such case, the partonomy relationship retrieved from the knowledge graph 106 between Term A and Term B can be filtered out and/or disregarded. In general, any relationship retrieved from the knowledge graph 106 can be checked for relevance in this way if an embedding can be trained to detect, capture, and/or predict the relation based on distributional semantics.

Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute, and so on) of the present innovation, components of the present innovation can examine the entirety or a subset of the data to which it is granted access and can provide for reasoning about or determine states of the system, environment, and so on from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 6:
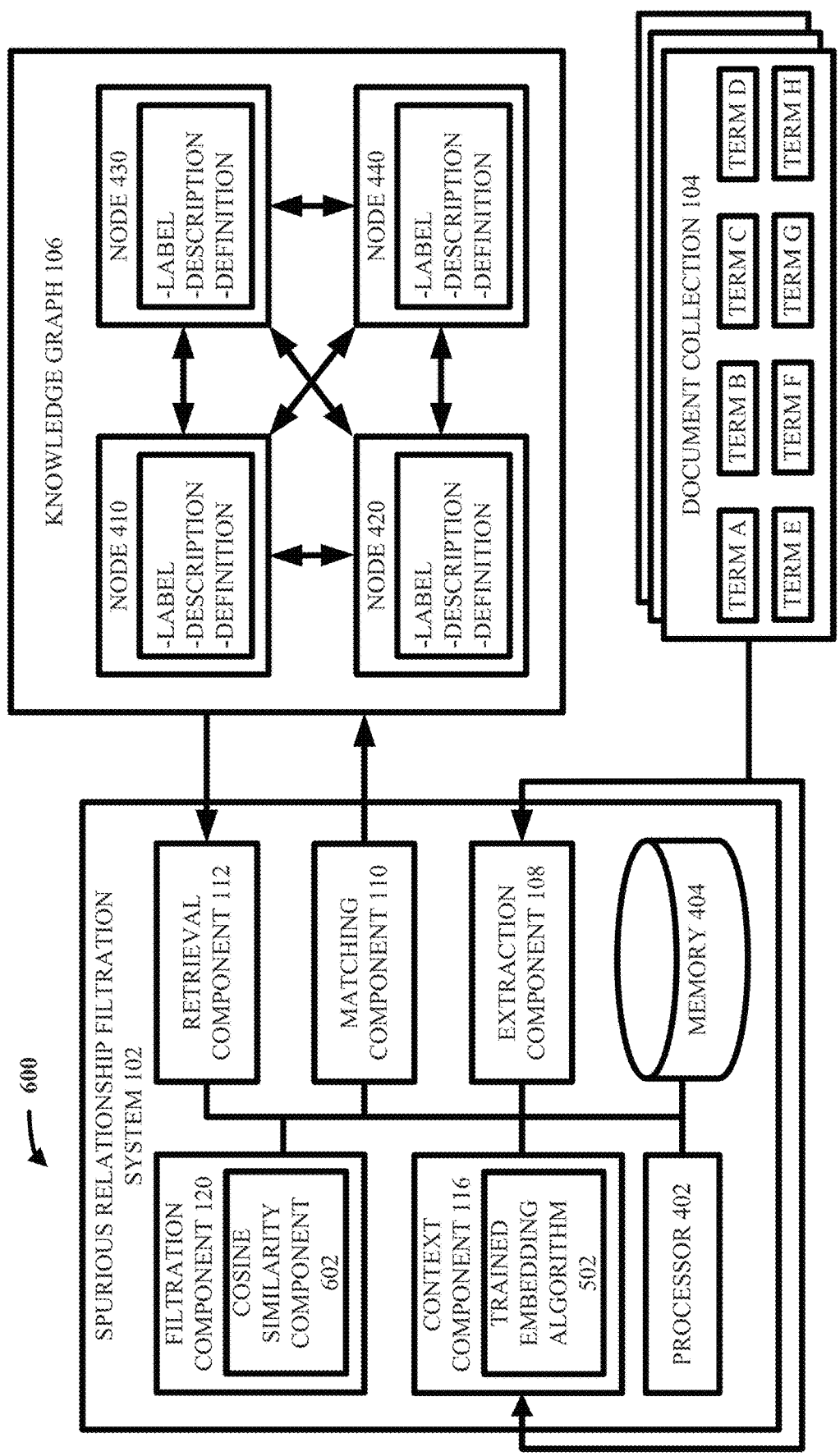
FIG. 6 illustrates a block diagram of an example, non-limiting system including a cosine similarity component that facilitates spurious relationship filtration in accordance with one or more embodiments described herein.

FIG. 6 illustrates a block diagram of an example, non-limiting system 600 including a cosine similarity component that can facilitate spurious relationship filtration in accordance with one or more embodiments described herein. As shown, the system 600 can, in one or more embodiments, comprise the same components as the system 500, and can further comprise a cosine similarity component 602.

In one or more embodiments, the filtration component 120 can filter out relationships retrieved from the knowledge graph 106 by computing, via the cosine similarity component 602, one or more cosine similarities of the vector representations generated by the context component 116. As one of ordinary skill in the art will understand, cosine similarity of two vectors X and Y is simply the cosine of the angle between those vectors (e.g., $cos(\theta)$). This can be computed using the Euclidean dot product according to the following formula:

$$\cos\theta = \frac{\vec{X} \cdot \vec{Y}}{\|\vec{X}\|\|\vec{Y}\|}$$

Figure 7:
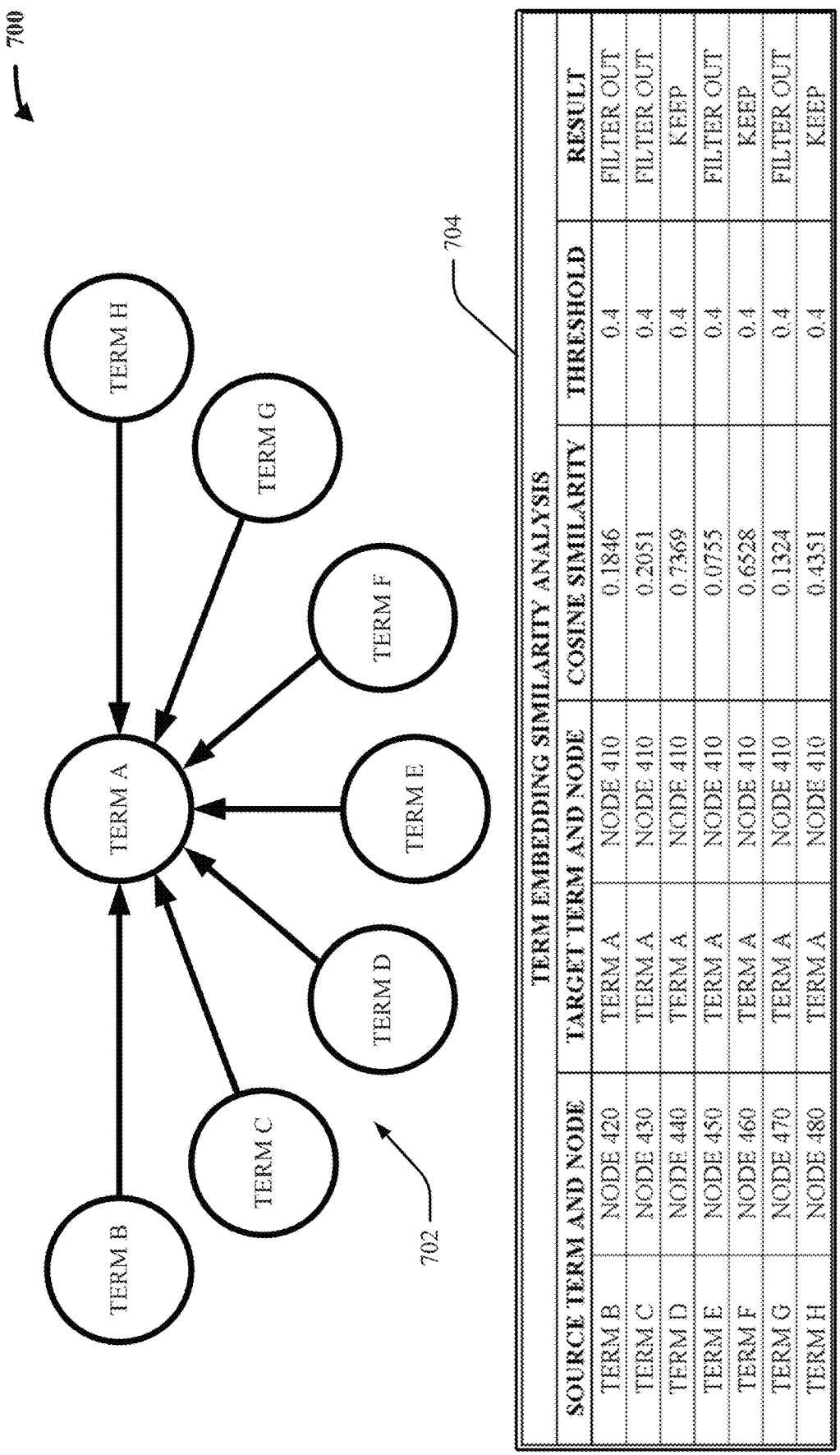
FIG. 7 illustrates an example, non-limiting diagram that depicts spurious relationship filtration via cosine similarity computations in accordance with one or more embodiments described herein.

Consider FIG. 7 for further explanation. FIG. 7 illustrates an example, non-limiting diagram 700 that depicts spurious relationship filtration via cosine similarity computations in accordance with one or more embodiments described herein. As shown, FIG. 7 depicts a relationship diagram 702 and a computation table 704. The relationship diagram 702 shows a nonlimiting example where the retrieval component 112 can have retrieved seven relationships (e.g., hypernymy relationships) from the knowledge graph 106. In such case, Terms A through H can have been extracted from the document collection 104 by the extraction component 108, and Terms A through H can have been matched to nodes in the knowledge graph 106 by the matching component 110. For instance, Term A can have been matched to Node 410, Term B can have been matched to Node 420, Term C can have been matched to Node 430, Term D can have been matched to Node 440, Term E can have been matched to Node 450 (not shown in the figures), Term F can have been matched to Node 460 (not shown), Term G can have been matched to Node 470 (not shown), and Term H can have been matched to Node 480 (not shown), as noted in the computation table 704. In this case, the knowledge graph 106 can have indicated that Term B (Node 420) is a hyponym of Term A (Node 410), as are Term C (Node 430), Term D (Node 440), Term E (Node 450), Term F (Node 460), Term G (Node 470), and Term H (Node 480). These seven hyponym relationships are illustrated by the relationship diagram 702 (e.g., arrow from Term B to Term A can represent that Term B is a hyponym of Term A, and so on).

Since some of these relationships can be spurious in the context of the document collection 104, the context component 116 can be trained to generate a context-based embedding of the terms to capture hypernymy relations, as described above. This can assign to each of Terms A through H a vector, based on the respective distributions of the Terms A through H in the document collection 104. The cosine similarity of the vectors of the two terms involved in each of these seven relationships can be computed by the cosine similarity component 602. These computed similarity values can then be compared to a threshold (e.g., 0.4 in the illustrated example, or any other suitable value chosen by an operator). Exemplary computations are listed in the computation table 704. For instance, the computation table 704 shows that the cosine similarity value between the vector representing Term B and the vector representing Term A can be 0.1846. Since this value is less than the threshold of 0.4, the hypernymy relationship retrieved from the knowledge graph 106 between Node 420 (Term B) and Node 410 (Term A) can be filtered out as spurious. As explained above, this low similarity value can be interpreted to mean that Term B and Term A are distributed throughout the document collection 104 in a manner, fashion, or pattern that is inconsistent with the existence of a hypernymy relationship between Term B and Term A. Similarly, the computation table 704 shows that the cosine similarity between the vector representing Term C and the vector representing Term A can be 0.2051. Since this is less than the threshold of 0.4, the relationship retrieved from the knowledge graph 106 between Node 430 (Term C) and Node 410 (Term A) can also be filtered out as spurious. However, as shown in the computation table 704, the cosine similarity between the vector representing Term D and the vector representing Term A can be 0.7369. Since this is greater than the threshold of 0.4, the relationship retrieved from the knowledge graph 106 between Node 440 (Term D) and Node 410 (Term A) can be retained as relevant. As explained above, this high similarity value can be interpreted to mean that Term D and Term A are distributed throughout the document collection 104 in a manner, fashion, or pattern that is consistent with the existence of a hypernymy relationship between Term D and Term A. As a concrete and nonlimiting example, the document collection 104 can be a technical support corpus pertaining to internet browsers, Term A can be the word "web browser," Term B can be the word "nexus," Term C can be "swift," Term D can be "chrome," Term E can be "opera," Term F can be "firefox," Term G can be "links," and Term H can be "internet explorer." Even though all of Nexus, Swift, Chrome, Opera, Firefox, Links, and Internet Explorer are technically web browsers, the document collection 104 can be using the words "nexus," "swift," "opera," and "links" in completely different senses, and so they can have similarity values that are lower than the threshold, as shown in the computation table 704.

In some embodiments, for each hypernym (e.g., Term A) identified by the retrieval component 112, the cosine similarity component 602 can compute a cosine similarity of the vector representing the hypernym to each of the vectors representing its hyponyms (e.g., Terms B to H).

One having ordinary skill in the art will appreciate that any relationship can be filtered in this way if an embedding can be trained to detect, capture, or predict that type of relation. Further, one having ordinary skill in the art will understand that other methods of comparison with the threshold are in accordance with various embodiments of the subject claimed innovation (e.g., filtering out if less than the threshold, filtering out if less than or equal to the threshold, filtering out if greater than the threshold (where lower values represent greater similarity), filtering out if greater than or equal to the threshold (where lower values represent greater similarity), and so on).

Figure 8:
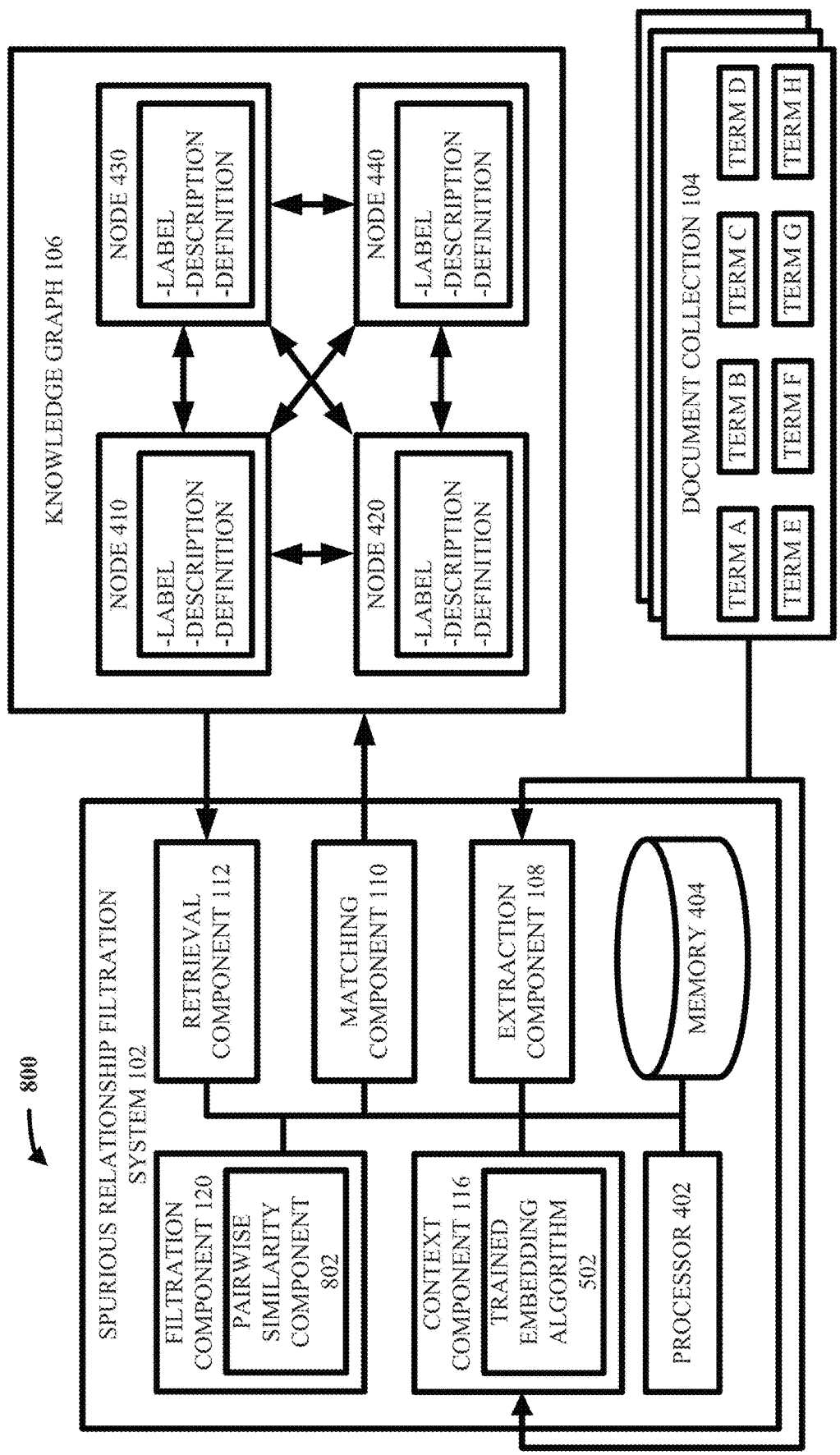
FIG. 8 illustrates a block diagram of an example, non-limiting system including a pairwise similarity component that facilitates spurious relationship filtration in accordance with one or more embodiments described herein.

FIG. 8 illustrates a block diagram of an example, non-limiting system 800 including a pairwise similarity component that can facilitate spurious relationship filtration in accordance with one or more embodiments described herein. As shown, the system 800 can, in one or more embodiments, comprise the same components as the system 500, and can further comprise a pairwise similarity component 802.

In one or more embodiments, the filtration component 120 can filter out relationships retrieved from the knowledge graph 106 by computing, via the pairwise similarity component 802, average pairwise cosine similarities of the vector representations generated by the context component 116.

Figure 9:
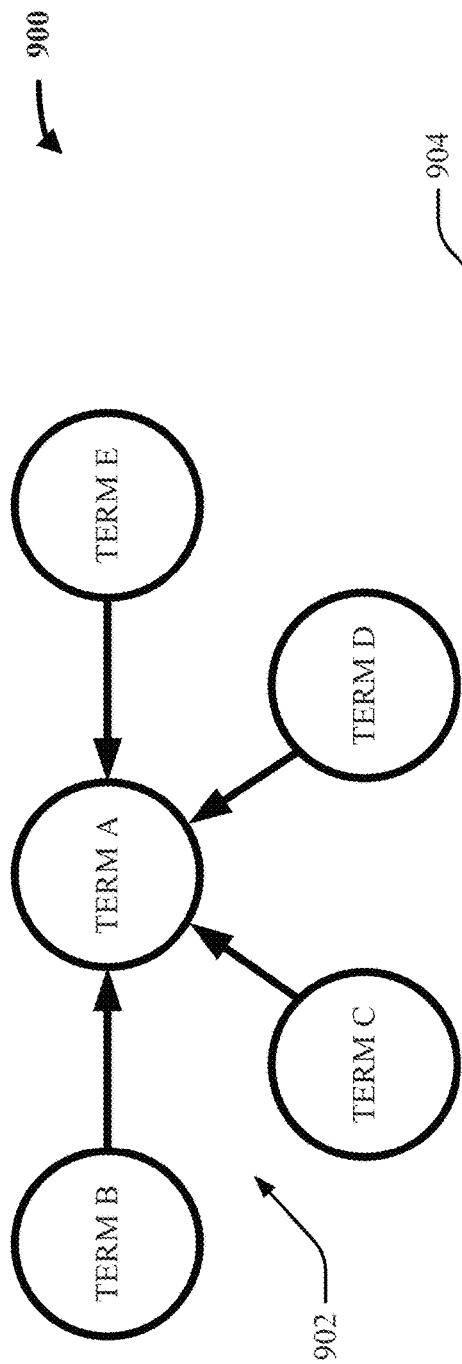
FIG. 9 illustrates an example, non-limiting diagram that depicts spurious relationship filtration via average pairwise cosine similarity computations in accordance with one or more embodiments described herein.

Consider FIG. 9 for further explanation. FIG. 9 illustrates an example, non-limiting diagram 900 that depicts spurious relationship filtration via average pairwise cosine similarity computations in accordance with one or more embodiments described herein. As shown, FIG. 9 depicts a relationship diagram 902 and a computation table 904. The relationship diagram 902 shows a nonlimiting example where the retrieval component 112 can have retrieved four relationships (e.g., hypernymy relationships) from the knowledge graph 106. In such case, Terms B through E can have been extracted from the document collection 104 by the extraction component 108, and Terms B through E can have been matched to nodes in the knowledge graph 106 by the matching component 110. Note that, in some embodiments that use average pairwise cosine similarity, Term A need not be extracted from or even be present in the document collection 104. In some instances, Term B can have been matched to Node 420, Term C can have been matched to Node 430, Term D can have been matched to Node 440, and Term E can have been matched to Node 450, as noted in the computation table 904. In this case, the knowledge graph 106 can have indicated that Term B (Node 420) is a hyponym of some Term A (which can correspond to a Node 410, but which need not be in the document collection 104), as are Term C (Node 430), Term D (Node 440), and Term E (Node 450). These four hyponym relationships are illustrated by the relationship diagram 902.

Since some of these relationships can be spurious, the context component 116 can be trained to generate a context-based embedding of the terms to capture hypernymy relations, as described above. This can assign to each of Terms B through E a vector, based on the respective distributions of the Terms B through E in the document collection 104. Note that since Term A need not be in the document collection 104, a vector representation for Term A need not be generated. The average pairwise cosine similarities of the vectors of the terms involved in each of these four relationships can be computed by the pairwise similarity component 802. These computed average pairwise similarity values can then be compared to a threshold (e.g., 0.4 in the illustrated example, or any other suitable value chosen by an operator). Exemplary computations are listed in the computation table 904. For instance, consider the computations that can determine whether to keep the hypernymy relationship as to Term B (e.g., upper left quadrant of computation table 904). The computation table 904 shows that the cosine similarity value between the vector representing Term B and the vector representing Term C can be 0.6123, the cosine similarity value between the vector representing Term B and the vector representing Term D can be 0.5627, and the cosine similarity value between the vector representing Term B and the vector representing Term E can be 0.1812. The average of these three cosine similarity values can then be computed and compared to the threshold to determine whether the hypernymy relationship with respect to Term B is spurious. Since the average pairwise similarity value for Term B is 0.4521 (e.g., average of 0.6123, 0.5627, and 0.1812), which is greater than the 0.4 threshold, the hypernymy relationship retrieved from the knowledge graph 106 between Node 420 (Term B) and Node 410 (Term A, which need not be in the document collection 104) can be retained as relevant. Similarly, consider the computations that can determine whether to keep the hypernymy relationship as to Term E (e.g., lower right quadrant of computation table 904). The computation table 904 shows that the cosine similarity value between the vector representing Term E and the vector representing Term B can be 0.1812, the cosine similarity value between the vector representing Term E and the vector representing Term C can be 0.2286, and the cosine similarity value between the vector representing Term E and the vector representing Term D can be 0.3156. The average of these three cosine similarity values can then be computed and compared to the threshold to determine whether the hypernymy relationship with respect to Term E is spurious. Since the average pairwise similarity value for Term E is 0.2418 (e.g., average of 0.1812, 0.2286, and 0.3156), which is less than the 0.4 threshold, the hypernymy relationship retrieved from the knowledge graph 106 between Node 450 (Term E) and Node 410 (Term A, which need not be in the document collection 104) can be filtered out as spurious.

In some embodiments, for each hyponym (e.g., Terms B to E) in a given hypernym (e.g., Term A, which need not be in the document collection 104) identified by the retrieval component 112, the pairwise similarity component 802 can compute an average pairwise cosine similarity of the vector representing the hyponym (e.g., Term B) to each of the vectors representing the other hyponyms (e.g., Terms C to E).

One having ordinary skill in the art will appreciate that any relationship can be filtered in this way if an embedding can be trained to detect, capture, or predict that type of relation. Further, one having ordinary skill in the art will understand that other methods of comparison with the threshold are in accordance with various embodiments of the subject claimed innovation (e.g., filtering out if less than the threshold, filtering out if less than or equal to the threshold, filtering out if greater than the threshold (where lower values represent greater similarity), filtering out if greater than or equal to the threshold (where lower values represent greater similarity), and so on).

Figure 10:
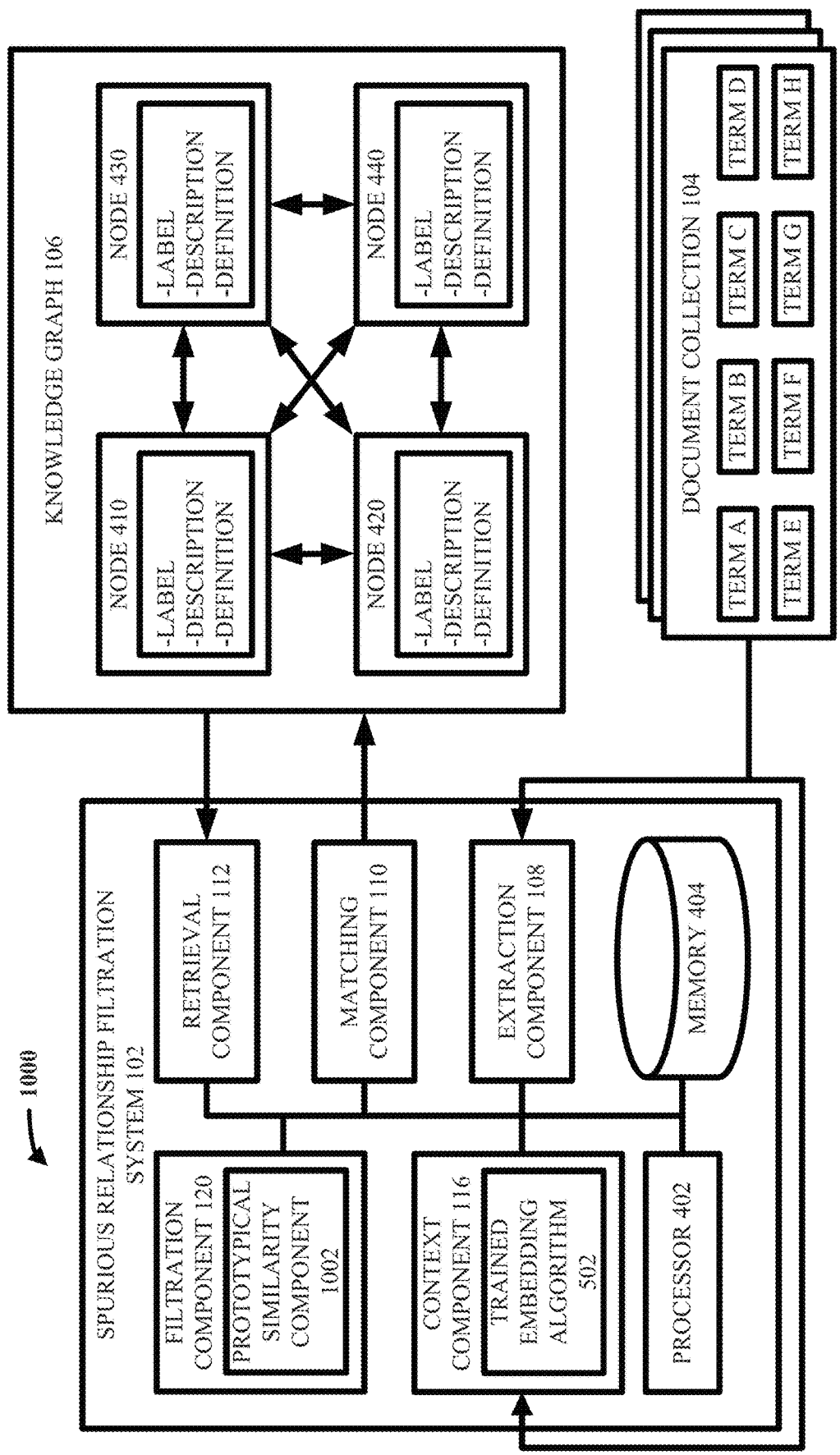
FIG. 10 illustrates a block diagram of an example, non-limiting system including a prototypical similarity component that facilitates spurious relationship filtration in accordance with one or more embodiments described herein.

FIG. 10 illustrates a block diagram of an example, non-limiting system 1000 including a prototypical similarity component that can facilitate spurious relationship filtration in accordance with one or more embodiments described herein. As shown, the system 1000 can, in one or more embodiments, comprise the same components as the system 500, and can further comprise a prototypical similarity component 1002.

In one or more embodiments, the filtration component 120 can filter out relationships retrieved from the knowledge graph 106 by computing, via the prototypical similarity component 1002, one or more cosine similarities of the vector representations generated by the context component 116. In particular, corpus statistics and/or probabilities can be used to identify a prototypical term (e.g., a term that occurs most often or most frequently in the document collection 104) in the group of embedded terms from the document collection 104, and the prototypical similarity component 1002 can compute substantially all cosine similarity values using the vector representing that prototypical term. In various embodiments, the similarity values can be based on pairwise similarity to the prototypical term and/or to a group of most prototypical terms in the document collection 104.

Figure 11:
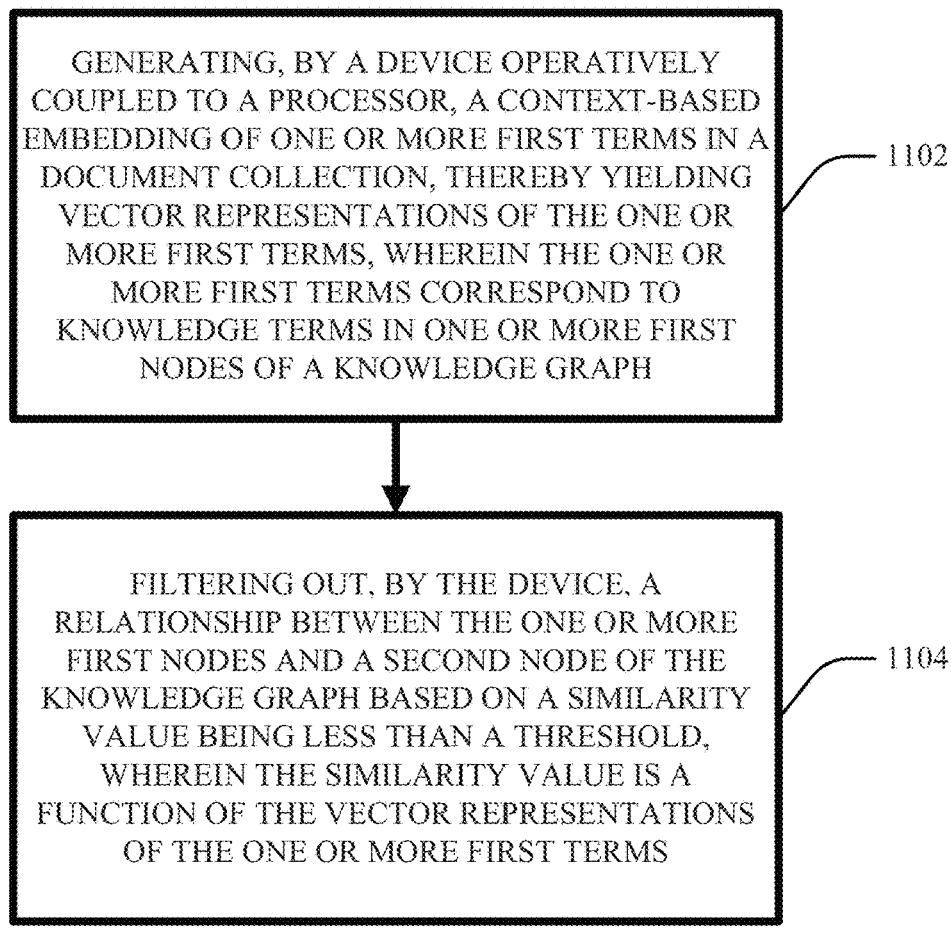
FIG. 11 illustrates a flow diagram of an example, non-limiting computer-implemented method that facilitates spurious relationship filtration in accordance with one or more embodiments described herein.

FIG. 11 illustrates a flow diagram of an example, non-limiting computer-implemented method 1100 that can facilitate spurious relationship filtration in accordance with one or more embodiments described herein.

At act 1102, the computer-implemented method can comprise generating, by a device operatively coupled to a processor, a context-based embedding (e.g., via context component 116) of one or more first terms (e.g., Terms B to H, as in FIG. 7) in a document collection (e.g., document collection 104). This can yield vector representations of the one or more first terms (e.g., a vector for Term B, a vector for Term C, a vector for Term D, and so on, as in FIG. 7). In some embodiments, the one or more first terms (e.g., Terms B to H, as in FIG. 7) can correspond to knowledge terms (e.g., labels, descriptions, definitions, other text, and so on) of one or more first nodes (e.g., Nodes 420 to 480, which can respectively correspond to Terms B to H, as in FIG. 7) of a knowledge graph (e.g., knowledge graph 106). At act 1104, the computer-implemented method can comprise filtering out, by the device, (e.g., via filtration component 120) a relationship (e.g., hypernymy) between the one or more first nodes (e.g., Nodes 420 to 480, as in FIG. 7) and a second node (e.g., Node 410 which can correspond to Term A, as in FIG. 7) of the knowledge graph. This filtering out can be based on a similarity value being less than a threshold, as explained above. In various embodiments, the similarity value can be a function (e.g., cosine similarity, Euclidean distance, and so on) of the vector representations of the one or more first terms (e.g., the vectors representing Terms B to H).

Figure 12:
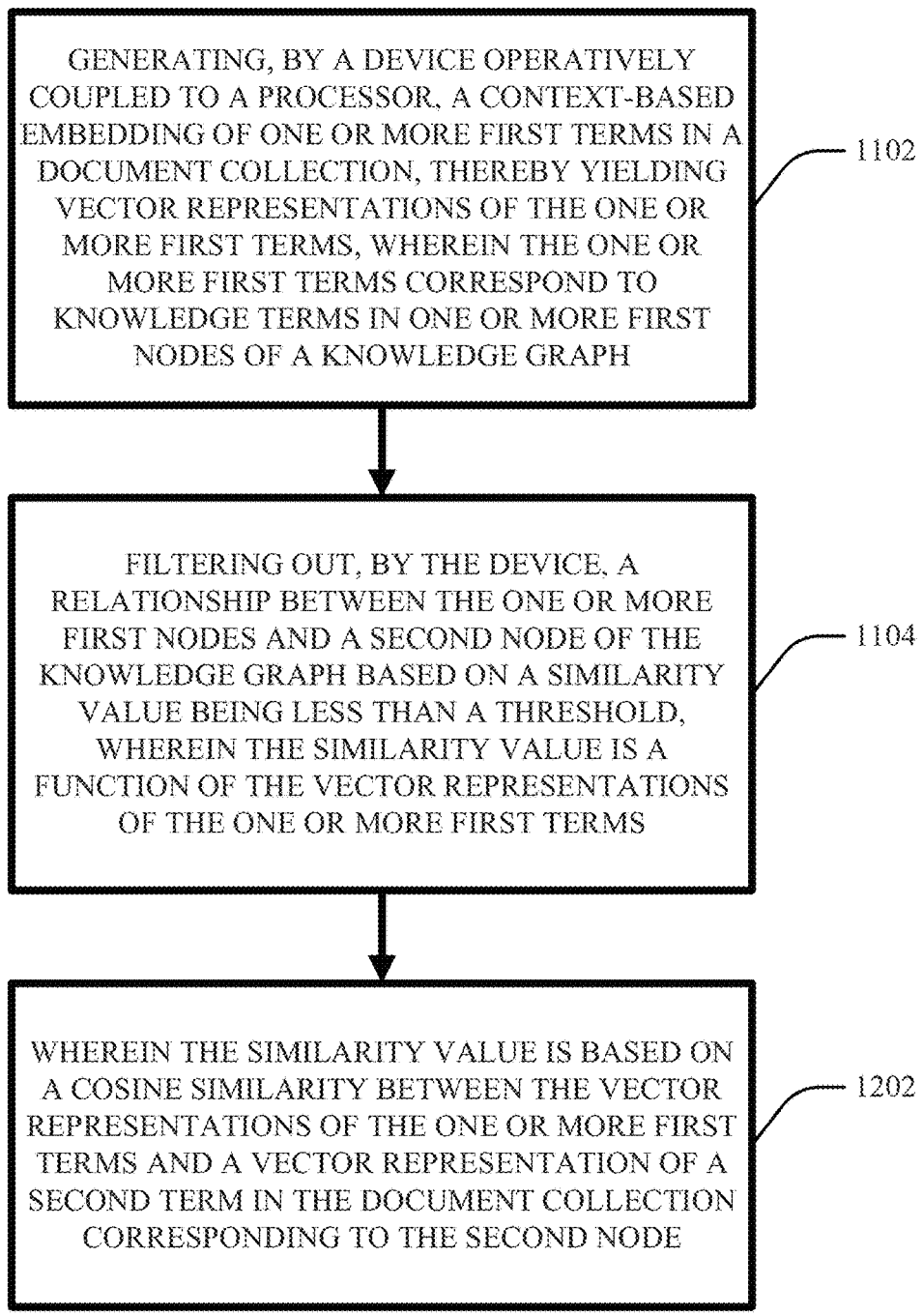
FIG. 12 illustrates a flow diagram of an example, non-limiting computer-implemented method that facilitates spurious relationship filtration via cosine similarity computations in accordance with one or more embodiments described herein.

FIG. 12 illustrates a flow diagram of an example, non-limiting computer-implemented method 1200 that can facilitate spurious relationship filtration via cosine similarity computations in accordance with one or more embodiments described herein. As shown, the computer-implemented method 1200 can, in various embodiments, comprise the same acts as the computer-implemented method 1100, and can further comprise act 1202.

At act 1202, the similarity value can be based on a cosine similarity between the vector representations of the one or more first terms (e.g., the vectors representing Terms B to H, as in FIG. 7) and a vector representation of a second term (e.g., the vector representing Term A, as in FIG. 7) in the document collection corresponding to the second node (e.g., Node 410, as in FIG. 7).

Figure 13:
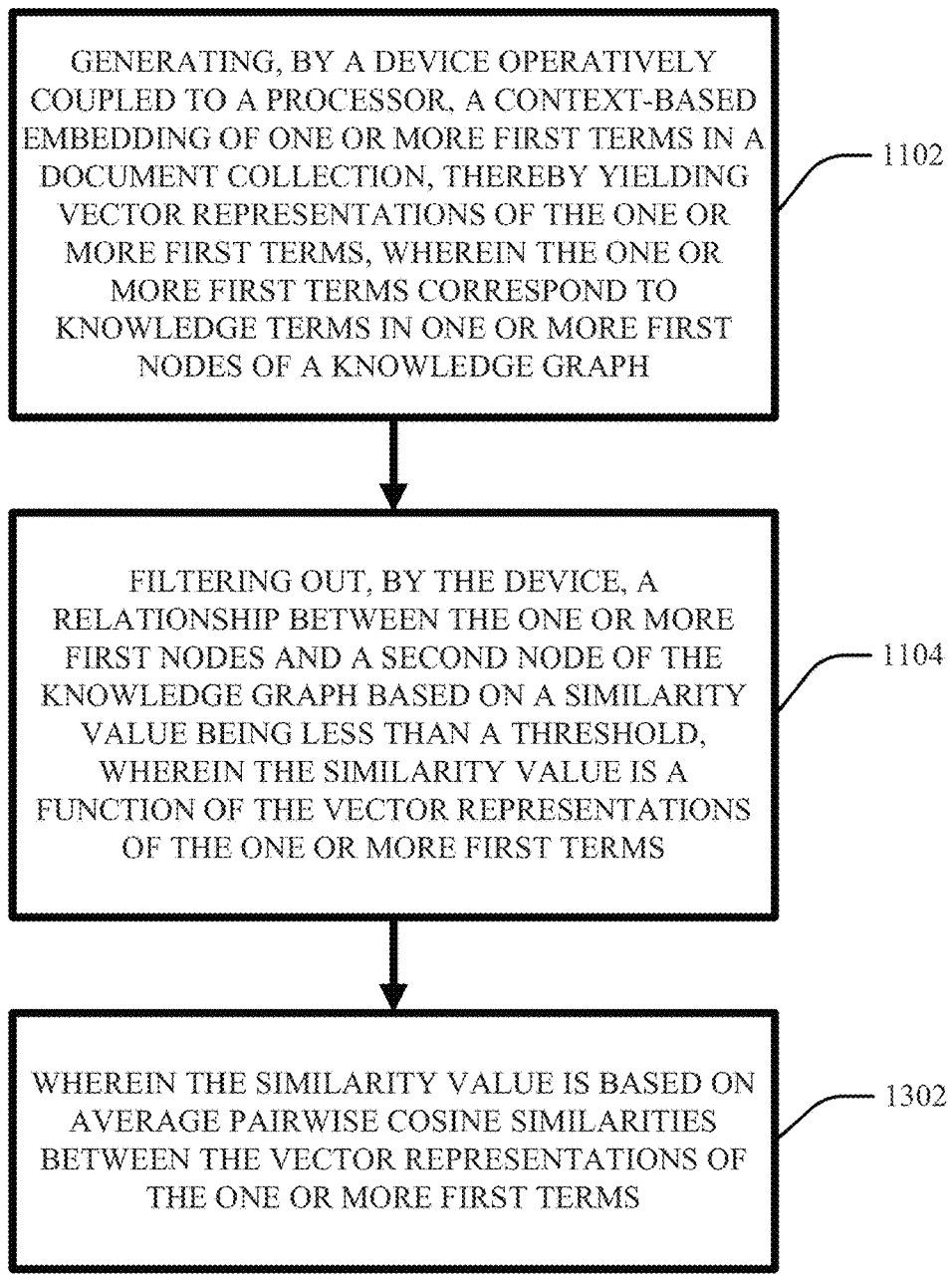
FIG. 13 illustrates a flow diagram of an example, non-limiting computer-implemented method that facilitates spurious relationship filtration via average pairwise cosine similarity computations in accordance with one or more embodiments described herein.

FIG. 13 illustrates a flow diagram of an example, non-limiting computer-implemented method 1300 that can facilitate spurious relationship filtration via average pairwise cosine similarity computations in accordance with one or more embodiments described herein. As shown, the computer-implemented method 1300 can, in various embodiments, comprise the same acts as the computer-implemented method 1100, and can further comprise act 1302.

At act 1302, the similarity value can be based on average pairwise cosine similarities (e.g., which computation is explained in FIG. 9) between the vector representations of the one or more first terms (e.g., the vectors representing Terms B to E, as in FIG. 9).

Figure 14:
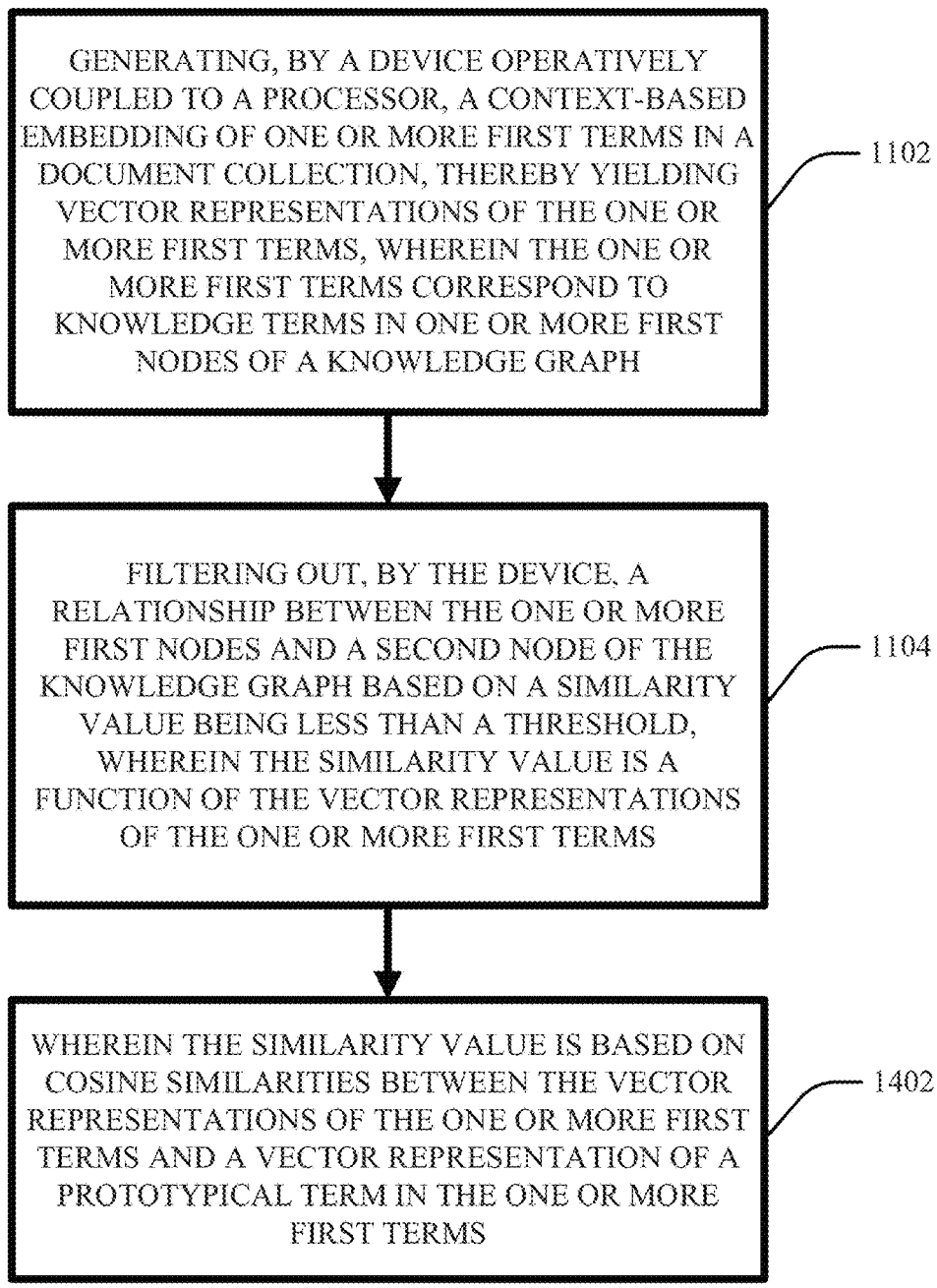
FIG. 14 illustrates a flow diagram of an example, non-limiting computer-implemented method that facilitates spurious relationship filtration via prototypical cosine similarity computations in accordance with one or more embodiments described herein.

FIG. 14 illustrates a flow diagram of an example, non-limiting computer-implemented method 1400 that can facilitate spurious relationship filtration via prototypical cosine similarity computations in accordance with one or more embodiments described herein. As shown, the computer-implemented method 1400 can, in various embodiments, comprise the same acts as the computer-implemented method 1100, and can further comprise act 1402.

At act 1402, the similarity value can be based on cosine similarities between the vector representations of the one or more first terms (e.g., vectors representing Terms B to H as in FIG. 7, or vectors representing Terms B to E as in FIG. 9) and a vector representation of a prototypical term in the one or more first terms (e.g., a term that occurs most frequently in the document collection 104).

Figure 15:
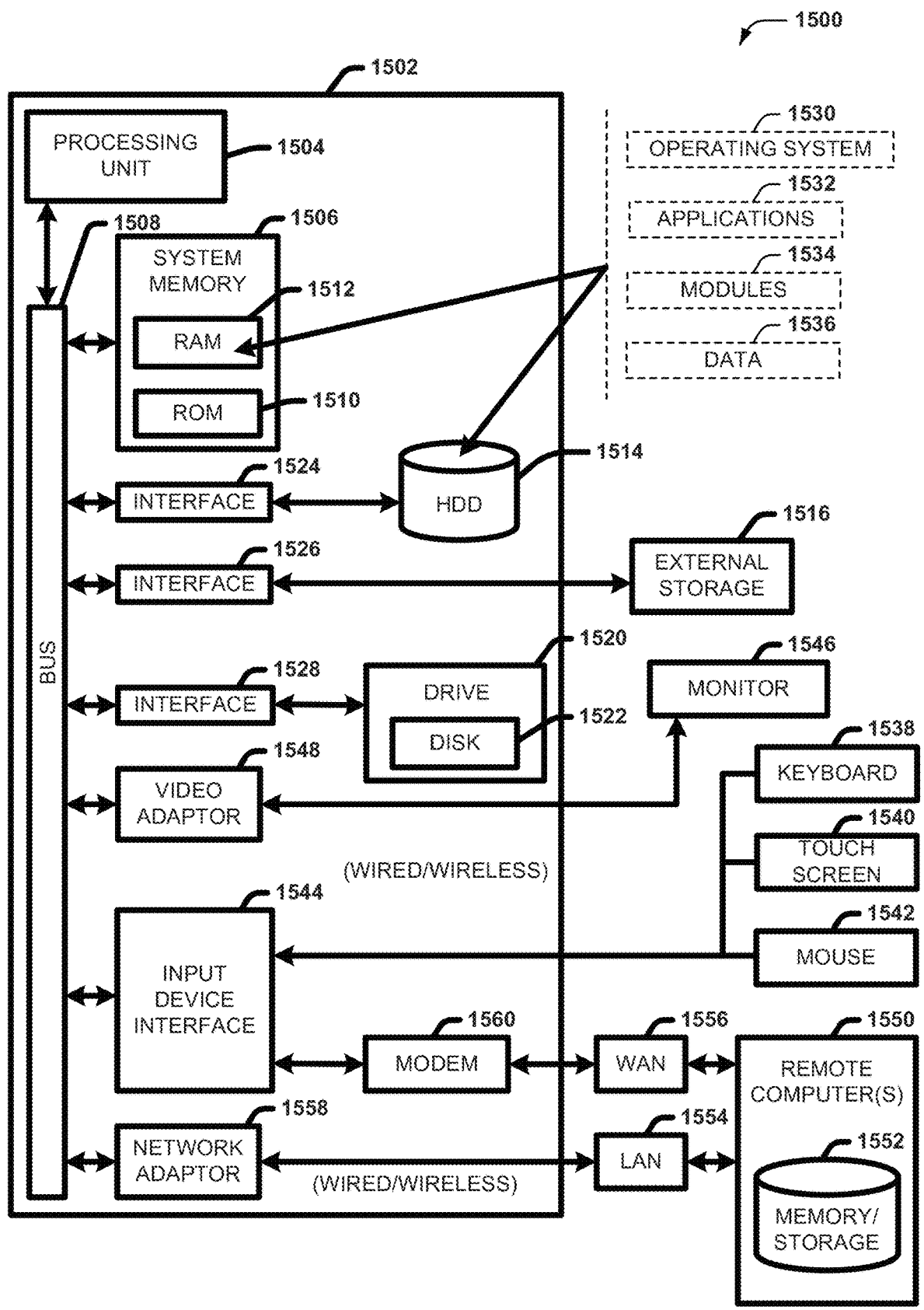
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor, operably coupled to the memory, that executes the computer-executable components stored in the memory, wherein the computer-executable components comprise:
   a context component that:
      generates a context-based embedding of one or more first terms in a document collection, thereby yielding vector representations of the one or more first terms, wherein the one or more first terms correspond to knowledge terms in one or more first nodes of a knowledge graph; and
      determines that at least two of the one or more first terms that have vector representations that have a similarity value that meets a defined criterion have a hypernymy relation between them, and determines that at least two of the one or more first terms that have vector representations that fail to have a similarity value that meets the defined criterion do not have a hypernymy relation between them, wherein the vector representations are compared to determine whether the hypernymy relation from the knowledge graph for the at least two of the one or more first terms is spurious; and a filtering component that filters out a relationship between the one or more first nodes and a second node of the knowledge graph based on the similarity value.

2. The system of claim 1, wherein:
the similarity value is based on a cosine similarity between the vector representations of the one or more first terms and a vector representation of a second term in the document collection corresponding to the second node.

3. The system of claim 1, wherein:
the similarity value is based on average pairwise cosine similarities between the vector representations of the one or more first terms.

4. The system of claim 1, wherein:
the similarity value is based on cosine similarities between the vector representations of the one or more first terms and a vector representation of a prototypical term in the one or more first terms.

5. The system of claim 1, wherein the knowledge terms are part of one or more labels, descriptions, definitions, or other text associated with the one or more first nodes.

6. The system of claim 1, wherein the relationship is one from the group consisting of a hypernym-hyponym relation, a synonymy relation, an antonymy relation, an entailment relation, and a partonomy relation.

7. The system of claim 1, wherein the one or more first terms correspond to the knowledge terms lexically, orthographically, morphologically, syntactically, or semantically.

8. The system of claim 1, wherein the context component generates the embedding of the one or more first terms via a neural network that employs a Continuous Bag of Words or Skip Gram methodology.

9. A computer-implemented method, comprising:
generating, by a device operatively coupled to a processor, a context-based embedding of one or more first terms in a document collection, thereby yielding vector representations of the one or more first terms, wherein the one or more first terms correspond to knowledge terms in one or more first nodes of a knowledge graph;
determining, by the device, that at least two of the one or more first terms that have vector representations that have a similarity value that meets a defined criterion have a hypernymy relation between them, and determine that at least two of the one or more first terms that have vector representations that fail to have a similarity value that meets the defined criterion do not have a hypernymy relation between them, wherein the vector representations are compared to determine whether the hypernymy relation from the knowledge graph for the at least two of the one or more first terms is spurious; and
filtering out, by the device, a relationship between the one or more first nodes and a second node of the knowledge graph based on the similarity value.

10. The computer-implemented method of claim 9, wherein:
the similarity value is based on a cosine similarity between the vector representations of the one or more first terms and a vector representation of a second term in the document collection corresponding to the second node.

11. The computer-implemented method of claim 9, wherein:
the similarity value is based on average pairwise cosine similarities between the vector representations of the one or more first terms.

12. The computer-implemented method of claim 9, wherein:
the similarity value is based on cosine similarities between the vector representations of the one or more first terms and a vector representation of a prototypical term in the one or more first terms.

13. The computer-implemented method of claim 9, wherein the knowledge terms are part of one or more labels, descriptions, definitions, or other text associated with the one or more first nodes.

14. The computer-implemented method of claim 9, wherein the relationship is one from the group consisting of a hypernym-hyponym relation, a synonymy relation, an antonymy relation, an entailment relation, and a partonomy relation.

15. The computer-implemented method of claim 9, wherein the one or more first terms correspond to the knowledge terms lexically, orthographically, morphologically, syntactically, or semantically.

16. The computer-implemented method of claim 9, wherein the generating the embedding of the one or more first terms is performed with a neural network that employs a Continuous Bag of Words or Skip Gram methodology.

17. A computer program product for facilitating spurious relationship filtration, the computer program product comprising a computer readable storage medium having program instructions embodied therewith, the program instructions executable by a processing component to cause the processing component to:
generate a context-based embedding of one or more first terms in a document collection, thereby yielding vector representations of the one or more first terms, wherein the one or more first terms correspond to knowledge terms in one or more first nodes of a knowledge graph;
determine that at least two of the one or more first terms that have vector representations that have a similarity value that meets a defined criterion have a supplier relation between them, and determine that at least two of the one or more first terms that have vector representations that fail to have a similarity value that meets the defined criterion do not have a supplier relation between them, wherein the vector representations are compared to determine whether the supplier relation from the knowledge graph for the at least two of the one or more first terms is spurious; and
filter out a relationship between the one or more first nodes and a second node of the knowledge graph based on the similarity value.

18. The computer program product of claim 17, wherein:
the similarity value is based on a cosine similarity between the vector representations of the one or more first terms and a vector representation of a second term in the document collection corresponding to the second node.

19. The computer program product of claim 17, wherein:
the similarity value is based on average pairwise cosine similarities between the vector representations of the one or more first terms.

20. The computer program product of claim 17, wherein:
the similarity value is based on cosine similarities between the vector representations of the one or more first terms and a vector representation of a prototypical term in the one or more first terms.

* * * * *